US009916500B2

(12) United States Patent
Solano et al.

(10) Patent No.: US 9,916,500 B2
(45) Date of Patent: Mar. 13, 2018

(54) METHOD AND SYSTEM FOR IMAGING DOCUMENTS, SUCH AS PASSPORTS, BORDER CROSSING CARDS, VISAS, AND OTHER TRAVEL DOCUMENTS, IN MOBILE APPLICATIONS

(71) Applicant: SimonComputing, Inc., Alexandria, VA (US)

(72) Inventors: Arturo M. Solano, Alexandria, VA (US); Truc C. Dao, Culpeper, VA (US)

(73) Assignee: SimonComputing, Inc., Alexandria, VA (US)

( * ) Notice: Subject to any disclaimer, the term of this patent is extended or adjusted under 35 U.S.C. 154(b) by 189 days.

(21) Appl. No.: 14/883,731

(22) Filed: Oct. 15, 2015

(65) Prior Publication Data

US 2016/0110597 A1 Apr. 21, 2016

Related U.S. Application Data

(60) Provisional application No. 62/065,286, filed on Oct. 17, 2014.

(51) Int. Cl.
| | | |
|---|---|---|
| G06K 9/00 | (2006.01) | |
| G06K 9/62 | (2006.01) | |
| G06T 11/00 | (2006.01) | |
| G06K 9/22 | (2006.01) | |
| G06K 9/32 | (2006.01) | |

(52) U.S. Cl.
CPC ....... *G06K 9/00456* (2013.01); *G06K 9/6247* (2013.01); *G06T 11/001* (2013.01); *G06K 9/00993* (2013.01); *G06K 9/325* (2013.01); *G06K 2009/226* (2013.01); *G06K 2209/01* (2013.01); *G06T 2207/20132* (2013.01); *G06T 2210/22* (2013.01)

(58) Field of Classification Search
None
See application file for complete search history.

(56) References Cited

U.S. PATENT DOCUMENTS 7,630,520 B2  12/2009  Visan et al.
7,813,547 B1  10/2010  Spangler
(Continued)

OTHER PUBLICATIONS

PCT International Search Report and the Written Opinion dated Jan. 11, 2016, in International App. No. PCT/US2015/055626, filed Oct. 15, 2015. (17 pp.)

*Primary Examiner* — Matthew Bella
*Assistant Examiner* — Jose M Torres
(74) *Attorney, Agent, or Firm* — Dines H Agarwal, P.C.

(57) ABSTRACT

A mobile computing device-implemented method of imaging an object to read information, includes capturing, by running an image capturing thread, a plurality of raw images of the object by an image capturing component of the mobile computing device and placing in an image queue in a first memory location; processing, by running an image processing thread, one or more raw images to extract one or more potential machine readable zone (MRZ) candidates and placing in a MRZ candidate queue in a second memory location; analyzing, by running an image analysis thread, an MRZ candidate to detect an MRZ and placing in an MRZ queue in a third memory location; and creating a composite MRZ if a timer has expired, or the MRZ queue has reached a predetermined threshold.

66 Claims, 18 Drawing Sheets

(56) References Cited

U.S. PATENT DOCUMENTS

| | | | |
|---|---|---|---|
| 8,175,386 B2 | 5/2012 | Kim | |
| 8,290,273 B2 | 10/2012 | Prasad et al. | |
| 8,606,021 B2 | 12/2013 | Conwell | |
| 8,705,836 B2 | 4/2014 | Gorski et al. | |
| 8,724,856 B1* | 5/2014 | King | G06K 9/00221 |
| | | | 340/5.82 |
| 8,947,745 B2 | 2/2015 | Zhao | |
| 9,031,278 B2 | 5/2015 | Boncyk et al. | |
| 9,058,515 B1 | 6/2015 | Amtrup et al. | |
| 9,652,602 B2* | 5/2017 | King | G06F 21/32 |
| 2002/0118379 A1 | 8/2002 | Chakraborty et al. | |
| 2006/0062459 A1 | 3/2006 | Saito et al. | |
| 2009/0152357 A1* | 6/2009 | Lei | G06F 17/30011 |
| | | | 235/454 |
| 2009/0154778 A1 | 6/2009 | Lei et al. | |
| 2011/0204142 A1* | 8/2011 | Rao | G06Q 10/06 |
| | | | 235/380 |
| 2012/0229872 A1* | 9/2012 | Dolev | G06F 21/64 |
| | | | 358/448 |
| 2012/0281077 A1* | 11/2012 | Canero Morales | G07D 7/20 |
| | | | 348/61 |
| 2013/0004076 A1 | 1/2013 | Koo et al. | |
| 2013/0243266 A1* | 9/2013 | Lazzouni | G06K 9/00885 |
| | | | 382/115 |
| 2013/0324161 A1 | 12/2013 | Rhoads et al. | |
| 2014/0010403 A1* | 1/2014 | Adam | G06T 1/005 |
| | | | 382/100 |
| 2014/0072219 A1* | 3/2014 | Tian | G06K 9/346 |
| | | | 382/171 |
| 2015/0009542 A1* | 1/2015 | Zhao | H04N 1/00331 |
| | | | 358/462 |
| 2016/0018656 A1* | 1/2016 | Nguyen | G06K 7/10821 |
| | | | 345/8 |
| 2017/0126784 A1* | 5/2017 | Mattern | H04L 67/10 |

* cited by examiner

```
RWZ1T
EHLUSAMOS<<FRAND<<<<<<<<<<<<<<<<<<ZKWCFH
X EWIIDIXDD601USA5001013MD6051847DO00000VYBUN
MW
Z X G ESQL
```
— MC

```
RWZ1T
EHLUSAMOS<<FRAND<<<<<<<<<<<<<<<<<<ZKWCFH
X EWIIDIXDD601USA5001013MD6051847DO00000VYBUN
MW
Z X GESQL
```
— MC

H H SEBPBBED — MC

```
WP<USAMOSS<<FRANK<<<<<<<<<<<<<<<<<XK<ZZZZ
X 7400000601USA5001013M0605184700000001<726692
```
— MR

```
NQGWZ 48
Z X 000064 OL
```
— MC

```
F NMHWUUD 7 M
0 EPEMSMBMSZMMMSMJNAMWMN SO YPAX< Q
SBB PBBGM 2
SJSAJ L
```
— MC

```
P<USAMOSS<<FRANK<<<<<<<<<<<<<<<<<<<<<<
X 3400000601USA5001013MO6051B4700000001<786692
```
— MR

FIG. 7

```
UD PY C DMDMHY
11UAMUMUDHANDX<<<<<<<<<<<<<<<HHMDFH F
1WUWJUUEPAUUUHH SM06US1847000000UVHH H
X UGQQ
0
Z X 530066
```
— MC

```
0 ZPESQSGIMIBMMSMNMM B TH S
                                      SBG PBBB 27
P<USAMOSS«FRANK<<<<<<<<<<<<<<<<<<<<<<<<<
X 3400000601USA5008013MO605184700000001<786692
```
— MC
— MR

```
Z TN
```
— MC

```
0 ZPESQSGIMIBMMSMNMM B TH S
SBG PBBB 27
P<USAMOSS<<FRANK<<<<<<<<<<<<<<<<<<<<<<<<
3400000601USA5008013MO605184700000001<786692
Z TN
```
— MC
— MR

FIG. 7
(continued)

```
P<USAMOSS<<FRANK<<<<<<<<<<<<<<<<<<<<<<<<
3400000601USA5008013MO605184700000001<786692
```

FIG. 8

```
P<USAMOSS<<FRANK<<<<<<<<<<<<<<<<<<<<<<<<
3400000601USA5008013MO605184700000001<786692
```

FIG. 9

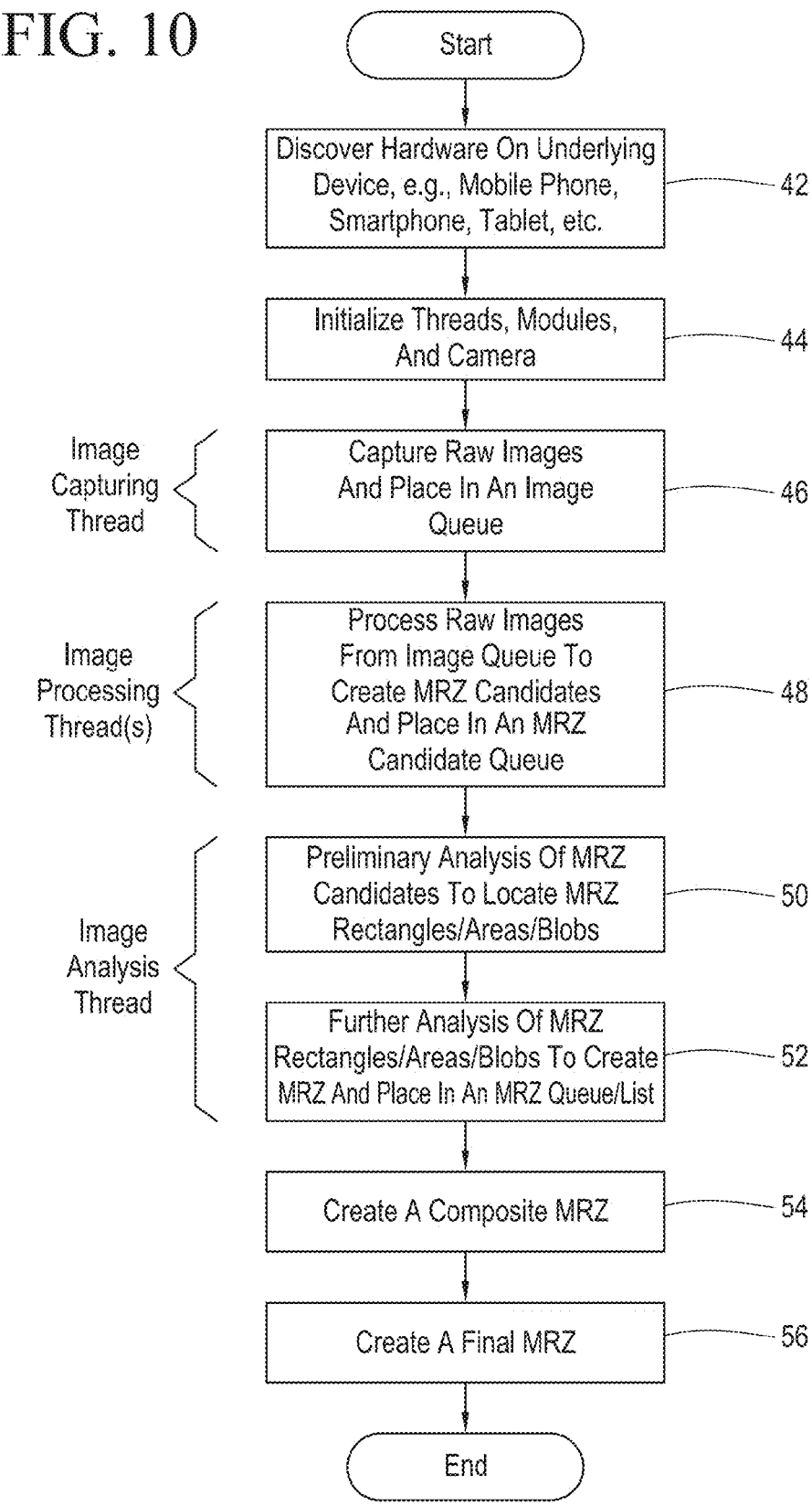

METHOD AND SYSTEM FOR IMAGING DOCUMENTS, SUCH AS PASSPORTS, BORDER CROSSING CARDS, VISAS, AND OTHER TRAVEL DOCUMENTS, IN MOBILE APPLICATIONS

CROSS-REFERENCE TO RELATED APPLICATIONS

The present application claims priority on prior U.S. Provisional Patent Application Ser. No. 62/065,286, filed Oct. 17, 2014, which is hereby incorporated herein in its entirety by reference.

FIELD AND BACKGROUND OF THE INVENTION

The present invention is generally directed to document imaging, and more particularly to automatically capturing travel document information for entry into systems related to processing travelers, particularly at airports, seaports, borders, etc. It relieves the entry person from having to manually type/enter this information. Even more specifically, it is a tool that can be integrated into a mobile application to capture the traveler's information from a travel document and presents it to the mobile application for further processing.

There is an increased demand for accurate and fast identification processing both by the public and private sectors. For the United States and foreign governments, this effort has been concentrated along the ports of entry. For the private sector, this effort has largely been concentrated in the airline and boating industry.

Businesses or government entities, as part of their identification process, have for years had the challenge of how to quickly and accurately process the information contained in the MRZ (machine readable zone—see FIG. 2) of travel documents. An MRZ typically includes two or three lines of text/characters provided at the bottom of the travel document, and may also include background imaging, textures, graphics, etc. The answer to doing this quickly and accurately for several decades has been to use document readers attached to work stations. Document readers that read travel documents have been around for over a decade. They are physical devices typically attached to a computer, and they tend to be bulky, thereby making it very difficult to use with mobile devices.

Presently, there are two types of document readers:

Swipe—the bottom portion of the travel document containing the MRZ is inserted into a slot and slide across this slot for the entire length of the travel document. A camera is located recessed within this slot. The first versions of these types of readers were bulky. Attempts at making them small enough to fit on tablets or smartphones has been challenging. To accurately process the MRZ, the MRZ being passed through the slot needs to be steady. This is difficult as you make the slot smaller to accommodate the size of a tablet or phone.

Flat Bed—the entire photo page of a travel document is laid flat against a glass platen. The travel document remains in a stationary position and a photograph is taken triggered by a mechanical switch or an image sensor. These readers are even larger than swipe readers but offer greater accuracy and ability to process other areas of the travel document photo page other than the MRZ.

In addition, a camera only method is available. The MRZ is read with a camera as a still image or streamed with a series of images. The MRZ is captured without the aid of an enclosed or guided area for the MRZ portion of the travel document.

Although, the flatbed document reader has been adapted to a smartphone, the size requirements have been prohibitive in its success. The swipe reader also has had a limited success on portable devices. The small size of the guide rail has been a challenge to ensure a stable image for accurate OCR (Optical Character Recognition).

Finally, there is yet another kind of mobile document processing solution. There are many vendors offering multi-function and ruggedized identification processing units. These units are not an expansion of a smartphone or tablet, but customized from factors containing proprietary electronics. These solutions are, however, specifically targeted at U.S. Defense Department related functions. The result is that almost all of these devices don't come with a travel document reader. Most of them come with a magnetic reader for military IDs. In the odd case where a document reader is supplied, it is a small swipe reader attached to the unit.

In summary, although recent innovations have reduced the size of a document reader to attach to mobile devices, this still requires a bulky attachment and increases the size of the mobile device. Bluetooth-based readers allow mobile devices to be mounted temporarily or be free standing on a desk, relieving the user from holding it. However, those devices require batteries, need charging, require either switching holding the mobile device and reader, or holding both at the same time. Either scenario presents a risk to the law enforcement personnel by not leaving a free hand to operate his/her handgun.

Various devices and methods for scanning and recognizing information in objects/documents are available as illustrated in U.S. Patents/Publications Nos. U.S. Pat. Nos. 9,058,515; 9,031,278; 8,947,745; 8,705,836; 8,606,021; 8,290,273; 8,175,386; 7,813,547; 7,630,520; and 2013/0004076A1.

ASPECTS AND SUMMARY OF THE INVENTION

The present disclosure is directed to various aspects of the present invention.

One aspect of the present invention is to provide a method and system for imaging documents, such as passports, border crossing cards, visas, and other travel documents, which can be easily implemented in a mobile application, such as a mobile phone, smartphone, tablet, etc.

Another aspect of the present invention is to provide a method and system for imaging documents, such as passports, border crossing cards, visas, and other travel documents, which uses a mobile device's camera to read and capture an image of the document.

Another aspect of the present invention is to provide a method and system for imaging documents, such as passports, border crossing cards, visas, and other travel documents, which enhances mobility thereby allowing processing from dynamic locations. Specifically, almost all of the travel document processing is currently done from fixed booth locations. The ability to do this in a mobile environment will enable security to be in more places and in an unpredictable manner. In addition, mobility will offer security to saturate areas more effectively and rapidly so that passengers may be processed more quickly, particularly in crowded areas.

Another aspect of the present invention is to provide a method and system for imaging documents, such as passports, border crossing cards, visas, and other travel documents, which is relatively small in size and low in weight, thereby encouraging use by the security personnel who are already encumbered with many devices, firearms, various communication devices, mace/pepper spray, handcuffs, baton, taser, etc.

Another aspect of the present invention is to provide a method and system for imaging documents, such as passports, border crossing cards, visas, and other travel documents, which further improves firearm safety by allowing the security personnel to securely hold and operate. In particular, security personnel must be able to draw their firearm easily, while operating a mobile device without any encumbrances.

Another aspect of the present invention is to provide a method and system for imaging documents, such as passports, border crossing cards, visas, and other travel documents, which improves positioning for capturing an MRZ image from a travel document.

Another aspect of the present invention is to provide a method and system for imaging documents, such as passports, border crossing cards, visas, and other travel documents, which eliminates confusion between the MRZ area and context sensitivity built into an OCR or the like software. In particular, the MRZ area is a fixed width area of letters and numbers and does not contain words or a sentence structure, which would facilitate reading by the OCR software. Typically, the OCR software relies on context sensitivity of words to make corrections on what it first recognizes.

Another aspect of the present invention is to provide a method and system for imaging documents, such as passports, border crossing cards, visas, and other travel documents, which recognizes the Farrington B font selected by ICAO (International Civil Aviation Organization), as well as other fonts, lettering, and/or indicia.

Another aspect of the present invention is to provide a method and system for imaging documents, such as passports, border crossing cards, visas, and other travel documents, which eliminates or scrubs any background information, pattern, graphics, and/or imaging that may be present in the MRZ text area, thereby facilitating and improving OCR recognition.

Another aspect of the present invention is to provide a method and system for imaging documents, such as passports, border crossing cards, visas, and other travel documents, the operation of which does not require any additional or external lighting due to excess or insufficient ambient light in the surrounding area where the document is being read.

Another aspect of the present invention is to provide a method and system for imaging documents, such as passports, border crossing cards, visas, and other travel documents, which has significantly enhanced capability to quickly capture an image from a travel document and read it accurately. In particular, an image can be captured and read in about one to three seconds.

Another aspect of the present invention is to provide a method and system for imaging documents, such as passports, border crossing cards, visas, and other travel documents, which crops a captured raw image(s) to approximately match the dimensions of an MRZ capture rectangle, thereby significantly reducing the amount of CPU and/or memory resources used when performing OCR. Additionally, this significantly enhances image processing and makes it more responsive.

Another aspect of the present invention is to provide a method and system for imaging documents, such as passports, border crossing cards, visas, and other travel documents, which runs multiple image processing threads substantially simultaneously, thereby significantly speeding up the processing of an MRZ.

Another aspect of the present invention is to provide a method and system for imaging documents, such as passports, border crossing cards, visas, and other travel documents, which runs an image processing thread(s) faster than an image analysis thread such that the MRZ candidate queue is constantly updated, thereby making the latest image(s) available for the image analysis thread.

Another aspect of the present invention is to provide a method and system for imaging documents, such as passports, border crossing cards, visas, and other travel documents, which processes and analyzes a raw image(s) of an MRZ and automatically produces an MRZ for display and/or further processing upon the occurrence of a predetermined event, thereby eliminating manual or user action reliance.

Another aspect of the present invention is to provide a method and system for imaging documents, such as passports, border crossing cards, visas, and other travel documents, which improves the functioning and utilization of a mobile or other computing device and the object/document imaging technology by, inter alia, utilizing less CPU/memory resources faster processing time, better/more accurate image, utilization of already-existing device components, e.g., processors.

Another aspect of the present invention is to provide a mobile computing device-implemented method of imaging an object to read information, which includes capturing a plurality of raw images of the object by an image capturing component of the mobile computing device and placing in a first queue in a first memory location; processing, in one or more processors of the mobile device, a plurality of raw images substantially simultaneously to extract potential machine readable zone (MRZ) candidates and placing in a second queue in a second memory location; analyzing one of the MRZ candidates from the second queue to detect the presence of a predetermined size MRZ rectangle; creating an MRZ blob if an MRZ rectangle is detected; processing the MRZ blob to form an MRZ; placing the MRZ in a third queue in a third memory location; and creating a composite MRZ if a timer has expired, or the third queue has reached a predetermined threshold.

Another aspect of the present invention is to provide a mobile computing device-implemented method of imaging an object to read information, which includes initializing a plurality of image processing threads; initializing one or more of image capturing and image analysis threads; capturing, by running the image capturing thread, a plurality of raw images of the object by an image capturing component of the mobile computing device and placing in an image queue in a first memory location; processing, by running the image processing threads, a plurality of raw images to extract potential machine readable zone (MRZ) candidates and placing in a MRZ candidate queue in a second memory location; analyzing, by running the image analysis thread, an MRZ candidate to detect an MRZ and placing in an MRZ queue in a third memory location; and creating a composite MRZ if a timer has expired, or the MRZ queue has reached a predetermined threshold.

Another aspect of the present invention is to provide a non-transitory computer-readable medium with instructions stored thereon, that when executed by a processing device, perform the steps: initializing a plurality of image processing threads; initializing one or more of image capturing and image analysis threads; capturing, by running the image capturing thread, a plurality of raw images of an object by an image capturing component of the processing device and placing in an image queue in a first memory location; processing, by running the image processing threads, a plurality of raw images to extract potential machine readable zone (MRZ) candidates and placing in an MRZ candidate queue in a second memory location; analyzing, by running the image analysis thread, an MRZ candidate to detect an MRZ and placing in an MRZ queue in a third memory location; and creating a composite MRZ if a timer has expired, or the MRZ queue has reached a predetermined threshold.

Another aspect of the present invention is to provide a system for imaging an object to read information, which includes an image capturing component; a control module that runs i) an image capturing thread to capture a plurality of raw images of the object by the image capturing component and place in an image queue, ii) a plurality of image processing threads, each of which processes a raw image to extract a potential machine readable zone (MRZ) candidate and places in an MRZ candidate queue, iii) an image analysis thread that analyzes an MRZ candidate to detect an MRZ and places in an MRZ queue; a first memory location for the image queue, a second memory location for the MRZ candidate queue; a third memory location for the MRZ queue. The control module creates a composite MRZ if a timer expires, or the MRZ queue has reached a predetermined threshold.

Another aspect of the present invention is to provide a mobile computing device-implemented method of imaging an object to read information, which includes capturing a plurality of raw images of the object by an image capturing component of the mobile computing device and placing in a first queue in a first memory location; processing, in one or more processors of the mobile device, a plurality of raw images substantially simultaneously to extract potential machine readable zone (MRZ) candidates and placing in a second queue in a second memory location; analyzing one of the MRZ candidates from the second queue to detect the presence of an MRZ; placing the MRZ in a third queue in a third memory location; and creating a composite MRZ if a timer has expired, or the third queue has reached a predetermined threshold.

Another aspect of the present invention is to provide a mobile computing device-implemented method of imaging an object to read information, which includes capturing, by running an image capturing thread, a plurality of raw images of the object by an image capturing component of the mobile computing device and placing in an image queue in a first memory location; processing, by running an image processing thread, one or more raw images to extract one or more potential machine readable zone (MRZ) candidates and placing in a MRZ candidate queue in a second memory location; analyzing, by running an image analysis thread, an MRZ candidate to detect an MRZ and placing in an MRZ queue in a third memory location; and creating a composite MRZ if a timer has expired, or the MRZ queue has reached a predetermined threshold.

In summary, the present invention is directed to a mobile computing device-implemented method of imaging an object to read information, which includes capturing, by running an image capturing thread, a plurality of raw images of the object by an image capturing component of the mobile computing device and placing in an image queue in a first memory location; processing, by running an image process-ing thread, one or more raw images to extract one or more potential machine readable zone (MRZ) candidates and placing in a MRZ candidate queue in a second memory location; analyzing, by running an image analysis thread, an MRZ candidate to detect an MRZ and placing in an MRZ queue in a third memory location; and creating a composite MRZ if a timer has expired, or the MRZ queue has reached a predetermined threshold.

BRIEF DESCRIPTION OF THE DRAWINGS

One or more of the above and other aspects, novel features and advantages of the present invention will become apparent from the following detailed description of a preferred embodiment(s) of the invention, as illustrated in the drawings, in which:

FIG. 7 is an illustration of various machine readable zone (MRZ) candidates created by an image processing thread in accordance with a preferred embodiment of the present invention;

FIG. 8 is an illustration of a composite machine readable zone (MRZ) created by further processing of the MRZ candidates of FIG. 7, in accordance with a preferred embodiment of the present invention;

FIG. 9 is an illustration of a final MRZ created from the composite MRZ of FIG. 8, in accordance with a preferred embodiment of the present invention;

FIG. 10 is a flow chart of a method of imaging an object to read information to create an MRZ in accordance with a preferred embodiment of the present invention;

DETAILED DESCRIPTION OF THE PREFERRED EMBODIMENT(S) OF THE INVENTION

Figure 1:
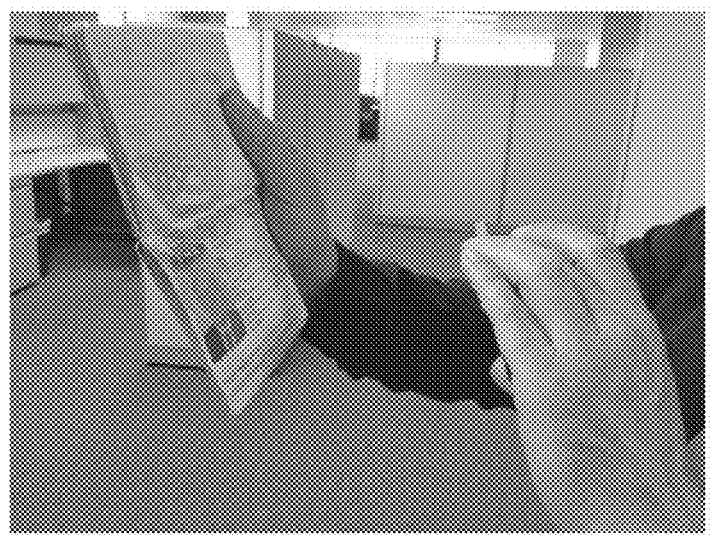
FIG. 1 is a perspective view of a passport being examined by a mobile device in accordance with a preferred embodiment of the present invention.

Briefly and generally speaking, the present invention uses a mobile device's camera to read a document. This eliminates the need for additional hardware for document reading and reduces the impact on the device's portability. Specifically, the invention reads/translates the machine-readable zone (MRZ) of a travel document to text characters by using Optical Character Recognition (OCR) or the like software. This transformation typically requires a large amount of processing resources. The invention uses multi-threading to speed the processing of the MRZ. Each mobile device normally contains multiple processors. The initialization of a preferred technique of the invention involves setting up the camera for a video feed with autofocus set on, and detecting how many processors exist on the mobile device. The technique preferably creates one or more image processing threads based on how many processors are detected, and at least image analysis thread.

When a video feed is being taken of a travel document, the MRZ only occupies a small portion of the portable mobile device's screen. This small area is called the MRZ capture rectangle area 10 (see FIG. 2). One thread is initialized to process the raw images and place in an image queue, which preferably has as many slots as the numbers of processors detected. This image processing thread accepts a raw image and cuts off the top and bottom parts of the image to preferably about ⅓ the height to match the dimensions of the MRZ capture rectangle. The image processing thread picks up a cropped image, and converts to a gray scale image, then performs background scrubbing on the cropped gray scale area to remove background patterns from a possible MRZ candidate residing in the MRZ capture rectangle. The image processing thread then places the potential MRZ candidates in an MRZ candidate queue. The more processors available on each mobile device, the more image processing threads are created.

The other thread (image analysis thread) that is created performs a detailed analysis on the images placed into the MRZ candidate queue. Preliminary analysis scans/searches for rectangles that appear as two or three line MRZ areas. If no rectangles appear as likely MRZ, then the image is discarded and the image analysis thread attempts to pick up another image from the MRZ candidate queue.

If the preliminary analysis yields a probable rectangle/area/blob of an MRZ, further/final processing then continues. The MRZ characters are parsed, validated, and corrected. Correction occurs based on the document type detected in the MRZ. Each MRZ has context sensitive field types—alpha, numeric, date, set, and check digit. An application of the invention would have a pre-loaded data storage containing preferably the definitions for all US travel documents and the international passport type. The processed character string is then placed on an MRZ queue.

Upon the first insertion of an MRZ character string into the MRZ queue, a timer begins. The process of capturing an MRZ ends when either this timer runs out, or a minimum of three MRZ character strings are placed into the MRZ queue.

Upon detecting final conditions for a capture, the invention analyzes each MRZ character string in the MRZ queue to create one composite having the most common characters in each column position.

The invention provides a widget or software application/controller/system that may be included in an integrated application. Users may create their own widgets by implementing a series of callbacks. A preferred application of an embodiment of the invention (see FIG. 2) displays a rectangle 10 in the middle of a video feed being displayed on the screen of a portable device. This is the capture rectangle where the MRZ should be centered in. The rectangle 10, preferably appears blue when no MRZ is detected, and green with a crosshairs 13, when it detects an MRZ. The translated text 12 preferably appears in green above the capture rectangle 10.

A preferred embodiment of the present invention is preferably implemented as a software application by using one or more of the following preferable components and features into the native camera of a smartphone, such as an iPhone®.

Mobile Device

Figure 4:
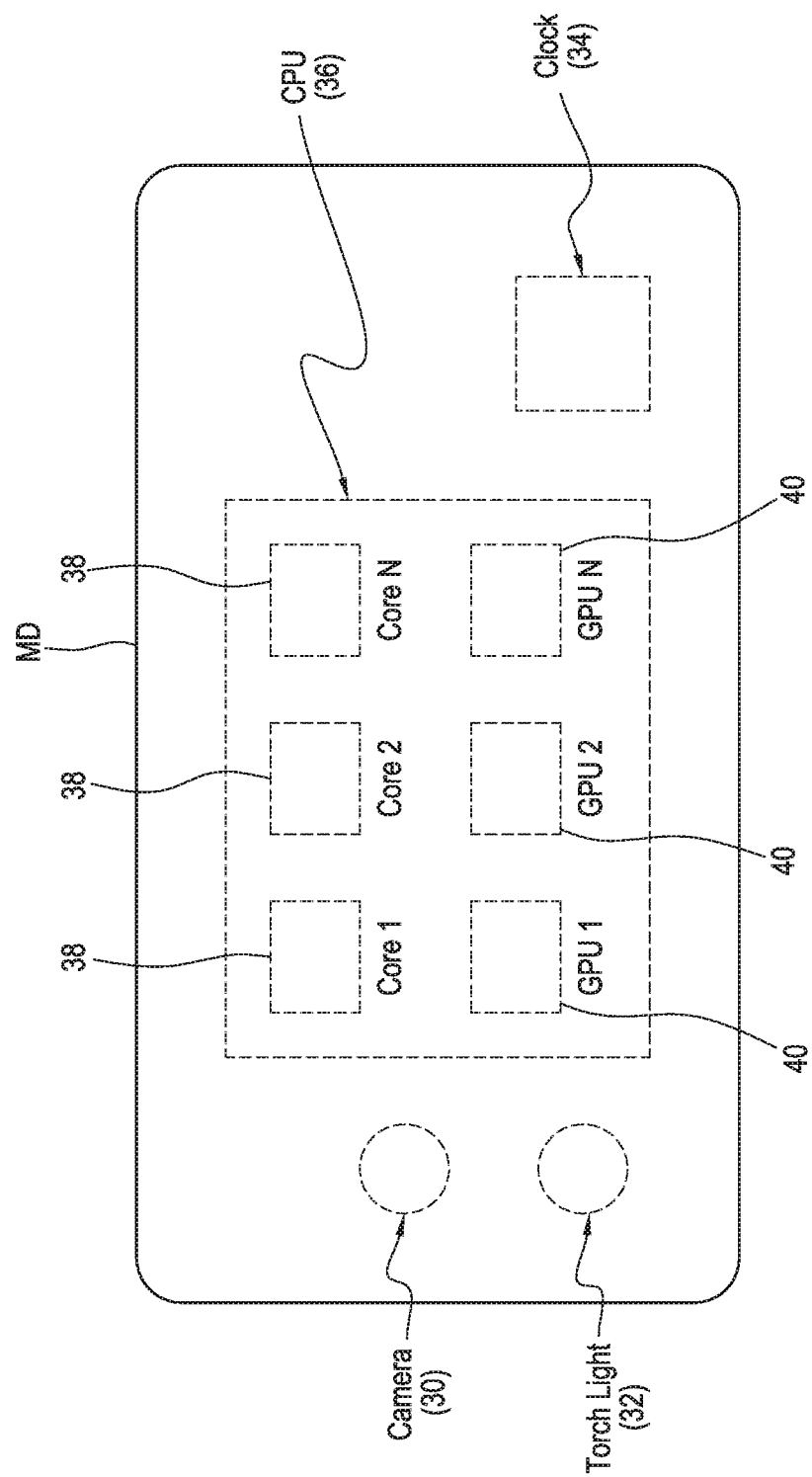
FIG. 4 is a block diagram showing various components of a mobile device.

As shown in FIG. 4, a conventional mobile device MD, such as a mobile phone or smart phone, includes a camera 30, a torch or flashlight 32, a clock or timer 34, and a central processing unit (CPU) 36. The CPU 36 would typically include multiple core processors 38, along with several graphics processers 40.

Image Analysis

Instead of one single still image, as done conventionally, multiple raw images are used for quality processing and analysis. Candidate MRZ images are cached for further analysis of the MRZ.

Background Scrubber

The MRZ area of a document can have background patterns and color. The patterns are used to make it more difficult to alter or counterfeit the travel document. These patterns and coloring create difficulties for OCR. The scrubber removes the background patterns and coloring so that only the text in the MRZ area will appear. The challenge is to provide the right level of scrubbing. Scrub too hard, and the text becomes faded or damaged. Scrub too soft, and you are still left with background pattern and coloring. Therefore, scrubbing is achieved by looking at the saturation differences and patterns within the MRZ capture rectangle. The invention preferably uses the widely available Google Leptonica Image scrubbing library, which is part of Tesseract OCR software (described below in more detail with reference to FIG. 13). The Leptonica contains the Otsu image thresholding method. The Otsu method is used to perform image thresholding or reduction of a gray level image to a binary image. To use this thresholding method, preferably three required parameters are set: OTSU_SMOOTH_X, OTSU_SMOOTH_Y, and OTSU_SCORE_FRACTION. The technique/application of the invention preferably sets OTSU_SMOOTH_X to 0, OTSU_SMOOTH_Y to 0, and OTSU_SCORE_FRACTION to 0.4. It is noted that these parameters may be set to different values under the scope of the invention.

MRZ Capture Rectangle (MCR)

Figure 2:
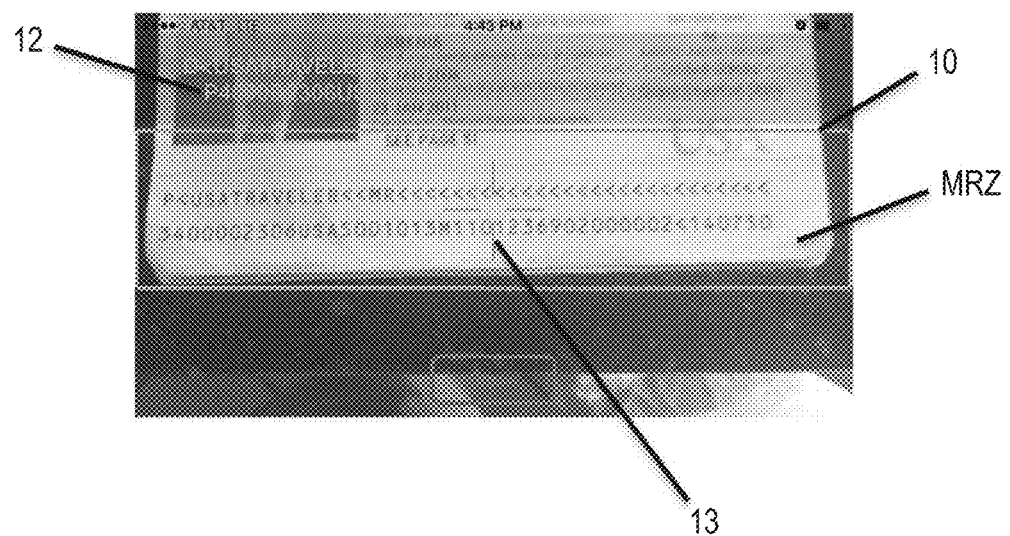
FIG. 2 is a portion of the passport of FIG. 2 showing an image of the machine readable zone (MRZ), as captured by a preferred embodiment of the present invention.

The amount of CPU (Central Processing Unit) and memory resources used when performing OCR can drastically be reduced if the image streamed from the built-in camera can be cropped to form a smaller rectangle of the area where the MRZ is recognized (see rectangle 10 in FIG. 2). When the OCR is limited to this smaller rectangle area, preview processing is more responsive.

Floating MRZ Capture Rectangle

The MRZ Capture Rectangle takes up about ⅓ of the screen for a mobile phone, particularly an iPhone®. It takes some time to line up the correct distance and to manually center the MCR over the MRZ. The MCR can be automatically centered over the MRZ. The rectangle will move so that it centers itself over the MRZ. This alleviates the issue where someone operating the mobile device may have an unsteady position, while streaming the images from the travel document. Specifically, after the MRZ data is extracted from a raw image via the Google Tesseract OCR software (described below in more detail with reference with FIG. 13), the MRZ data contains the text line bounding box coordinates. Using the text line bounding box coordinates, the image processing thread moves the MRZ capture rectangle up or down to follow the MRZ lines to auto center an MRZ.

Final Image Analysis Using Candidates

As mentioned previously, during the preliminary analysis phase, MRZ candidate rectangles/areas/blobs are accumulated for further analysis. The preliminary analysis quickly determines which image to put into the cache by looking for text that has the width and height of either a 2 or 3 line MRZ (described below in more detail).

Multi-Threading

One of the performance challenges is the length of time it takes for an image to be processed for OCR recognition and correction. iPhones®, like many other smartphones, contain multiple processors. For example, the iPhone® 5s contains four processors, along with several graphics processors. When an application according to a preferred embodiment of the invention initializes, it determines how many processors are available.

Auto Capture

Figure 14:
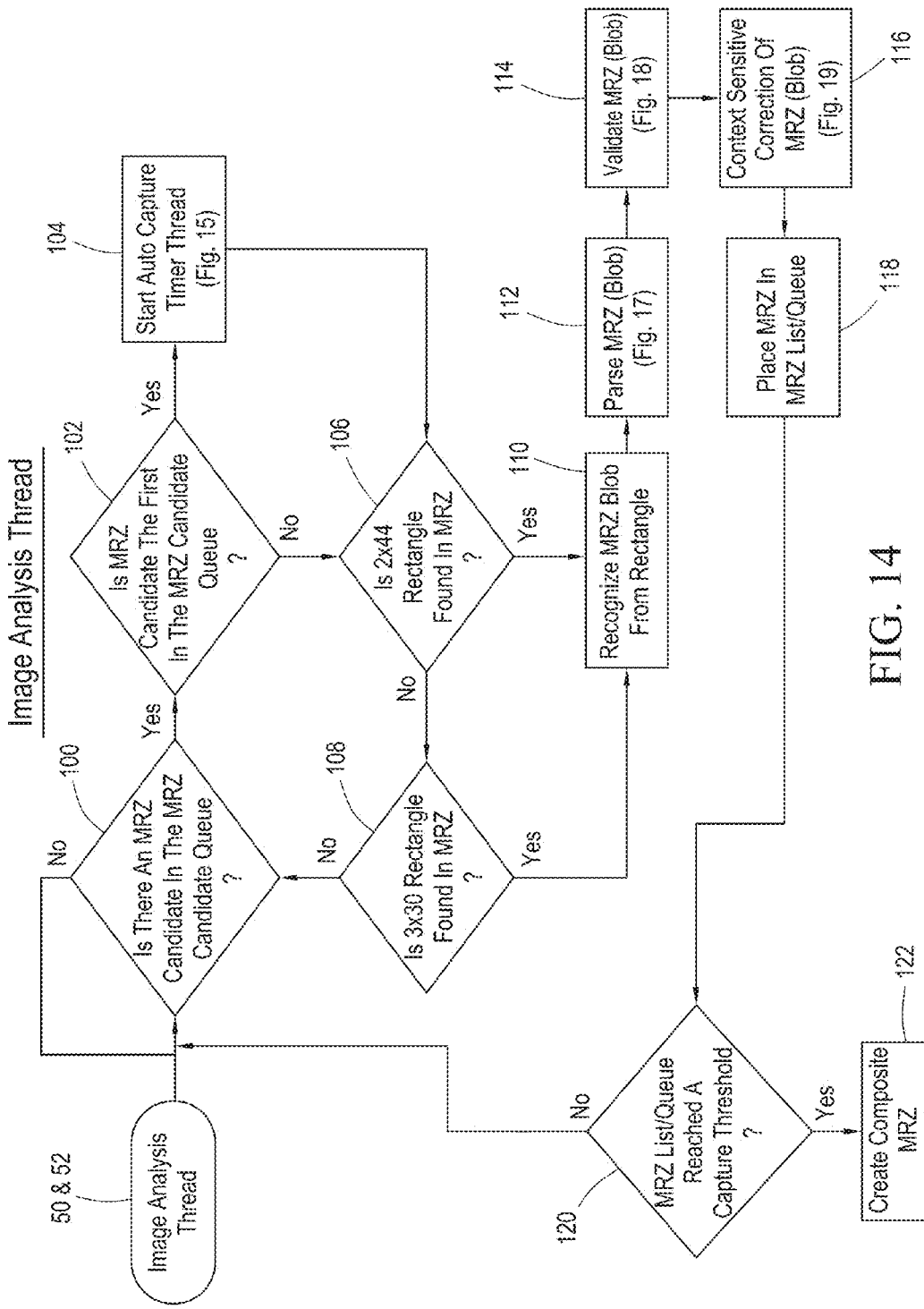
FIG. 14 is a flow chart showing details of image analysis step/thread of FIG. 10.

The auto capture is a timer that is activated when the image analysis thread first recognizes an MRZ candidate (FIG. 14). Capture of the MRZ (creation of composite MRZ) happens when one of two possible situations occur the parameters of which are preselected:

Auto capture timer has expired; or

The image analysis thread has populated the MRZ list/queue with enough MRZs. Preferably, at least two, and more preferably three to five.

The auto capture is advantageous because it lets the application determine when the images are of sufficient quality to capture, rather than some manual action.

Composite Corrector (CC)

Figure 16:
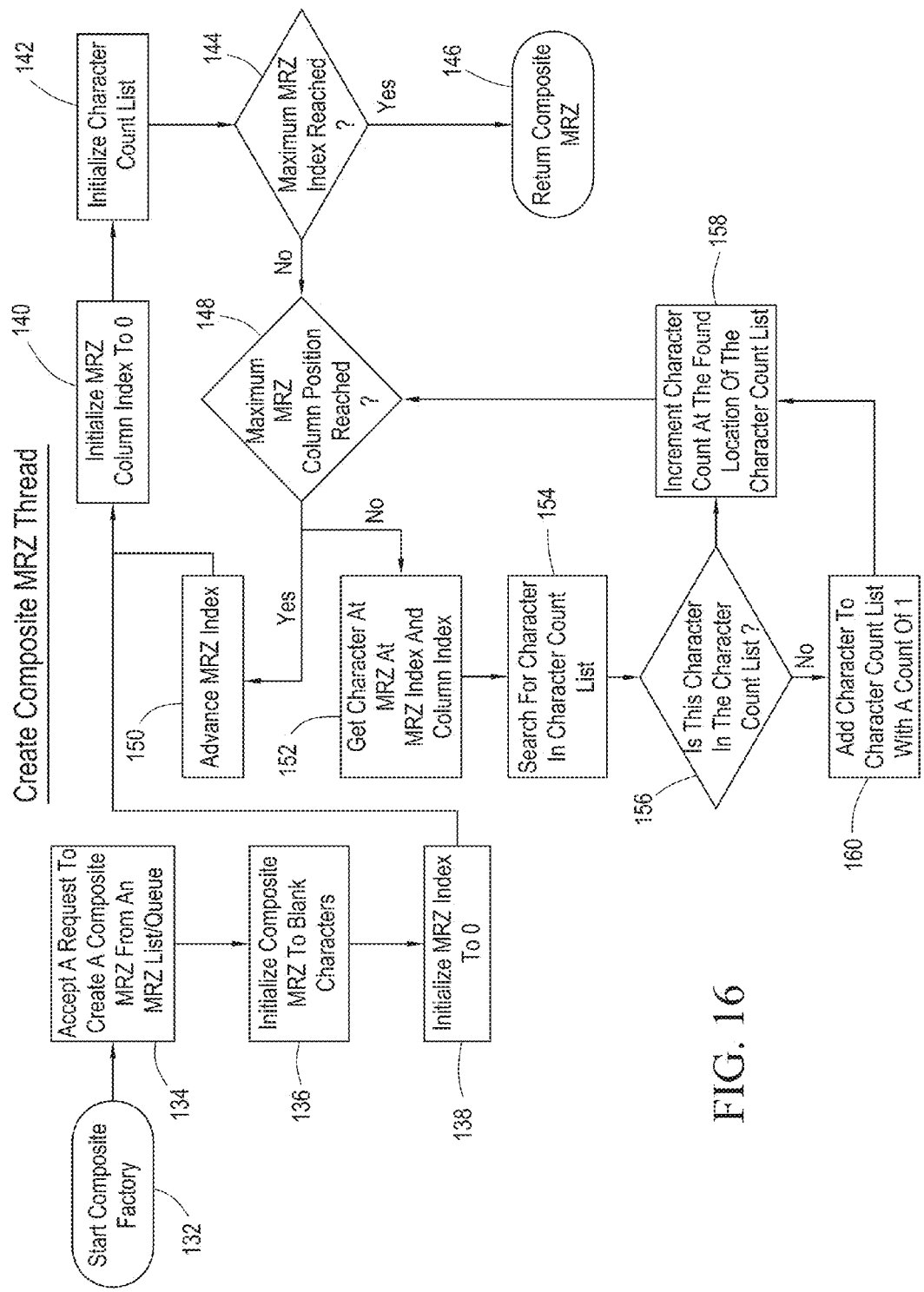
FIG. 16 is a flow chart showing details of creating a composite MRZ step/thread of FIG. 14.

The CC module (described below in more detail) increases the accuracy of the MRZ capture by creating one master or composite MRZ (FIG. 16). This MRZ is a composite of all the candidate MRZ images. If there are more than two candidate images, the characters from the candidate MRZ are placed into columns where the characters having the highest frequency in each column determine the final character in that column. The concentration of all the highest frequency characters in each column produces one master or composite MRZ.

Context Sensitive Character Correction

Figure 17:
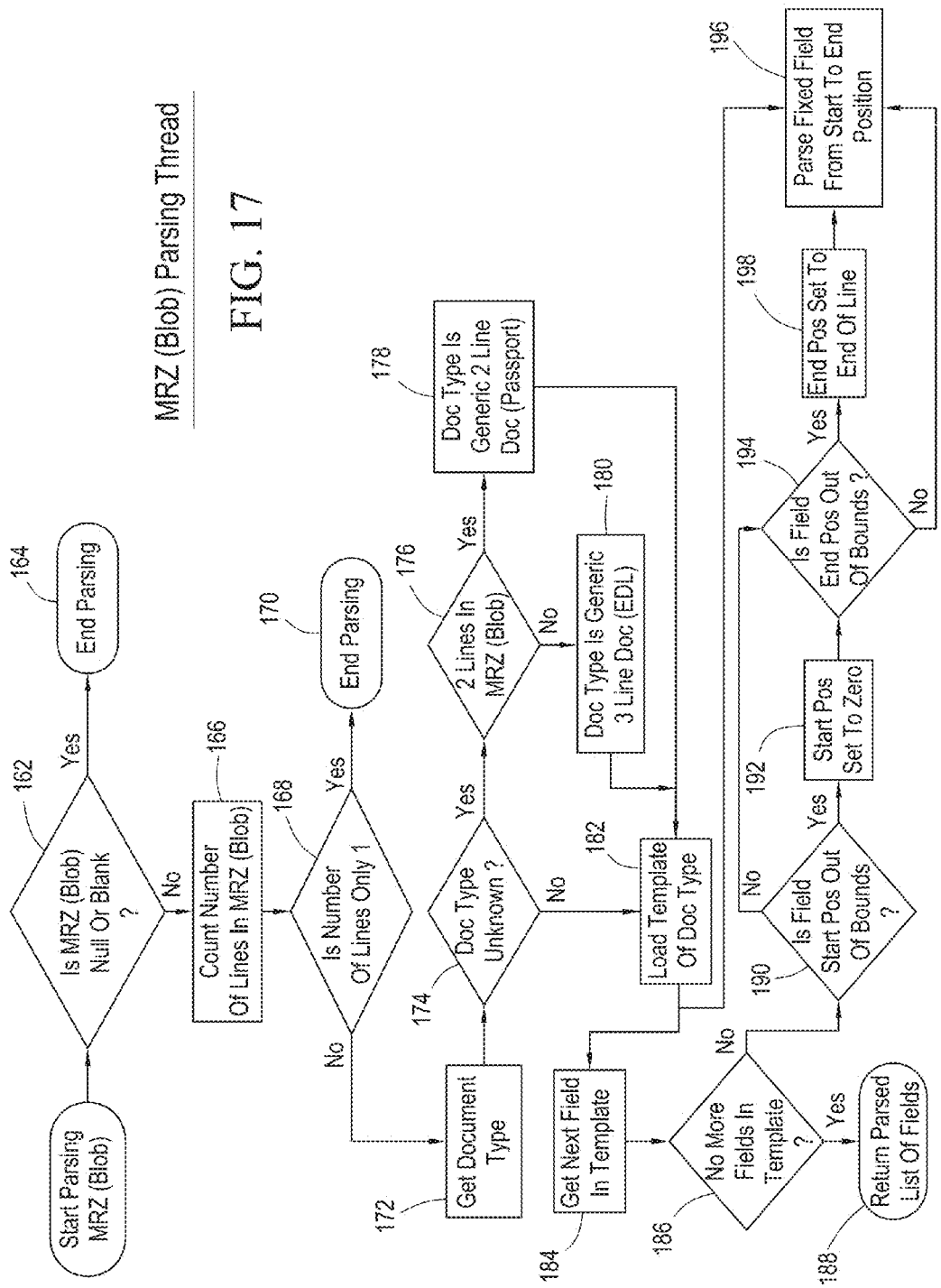
FIG. 17 is a flow chart showing details of the parsing of MRZ (blob) step of FIG. 14.

The application parses the MRZ to determine the type/kind of travel document being read (FIG. 17). Once this is known, it breaks the MRZ into individual fields. Fields within an MRZ can be alpha, numeric, and/or date type. The parser applies the context of each field to make corrections to the OCR.

Figure 3:
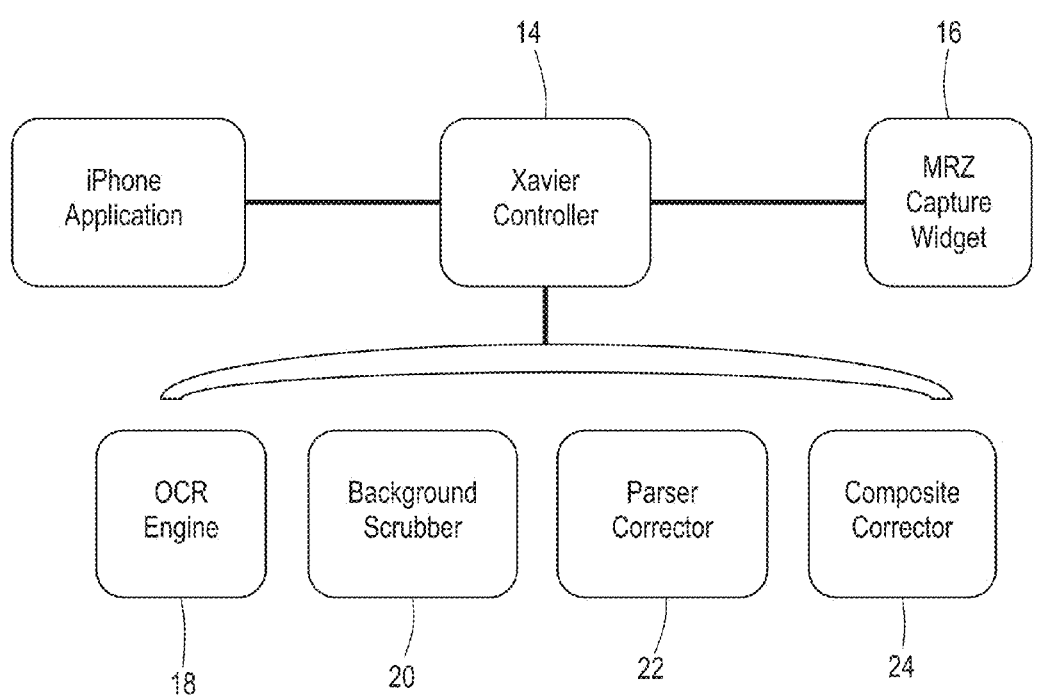
FIG. 3 is a block diagram showing preferred main components for use in a preferred embodiment of the present invention.

As an example, referring to FIG. 3, one application of the present invention is a static library, preferably written for IOS® applications. (It is noted herewith that it is within the scope of the present invention to create a similar or different library for other mobile applications/platforms, available now or developed later.) The IOS® application integrates with the application by using Objective C delegate protocol. The top connecting lines indicate the delegate protocol communication.

As described below, the application includes several modules and is preferably built with the MVC (model view controller) architecture.

The highest-level module, which preferably contains the other modules, is a controller 14. As mentioned previously, this module may integrate with the IOS® application and, in addition, an MRZ capture widget 16. Both of these connecting modules are the "Viewer" components within the MVC architecture.

The MRZ capture widget 16 is provided as a standard widget control to capture MRZ from travel documents. An IOS® Application implementing the delegates' protocol may design a custom capture widget.

An OCR engine 18 is a module contained within the controller 14 that performs the OCR of the images.

A background scrubber 20 is a module contained within the controller 14 that scrubs the background color and patterns from the MRZ capture rectangle images.

A parser corrector 22 is a module contained within the controller 14 that parses the OCR of the MRZ text and makes corrections.

A composite corrector 24 is a module contained within the controller 14 that creates a composite MRZ from the MRZ candidates.

As noted above, the present invention uses at least two types of threads (FIG. 10) that run to collect the data for an image capture of the MRZ. Preferably, the image processing thread (FIG. 13) runs at a very fast speed in relation to the image analysis thread (FIG. 14). Preferably, the image processing thread runs 10-50 times faster than the image analysis thread. (It is noted that it is within the scope of the invention to vary the noted speeds of the image processing and/or image analysis threads.) The image processing thread constantly updates the MRZ candidate queue so that the image analysis thread will have the latest image to pop off the queue.

As noted above, an MRZ will be captured (composite MRZ created) if either of these two conditions occur: the auto capture timer notifies that it has expired, or the image analysis thread has collected a sufficient number (at least 2-5) of MRZs. It is noted that the number of MRZs needed to create a composite MRZ can be raised higher than five, e.g., 6-30, if desired.

When the MRZ reaches the final condition for capture, the final steps are taken to form a composite MRZ (FIG. 16).

Figures 5, 6:
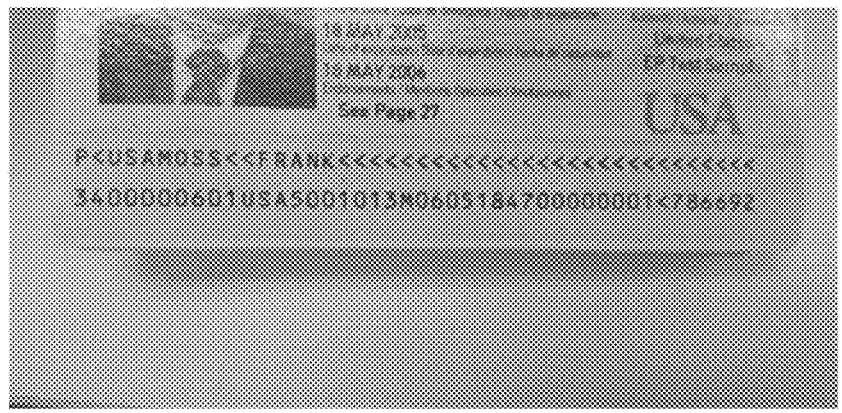
FIG. 5 is an illustration of a raw image of a machine readable zone (MRZ) captured for processing by a preferred embodiment of the present invention.
FIG. 6 is a cropped, gray scale image of the MRZ shown in FIG. 5.
Figure 12:
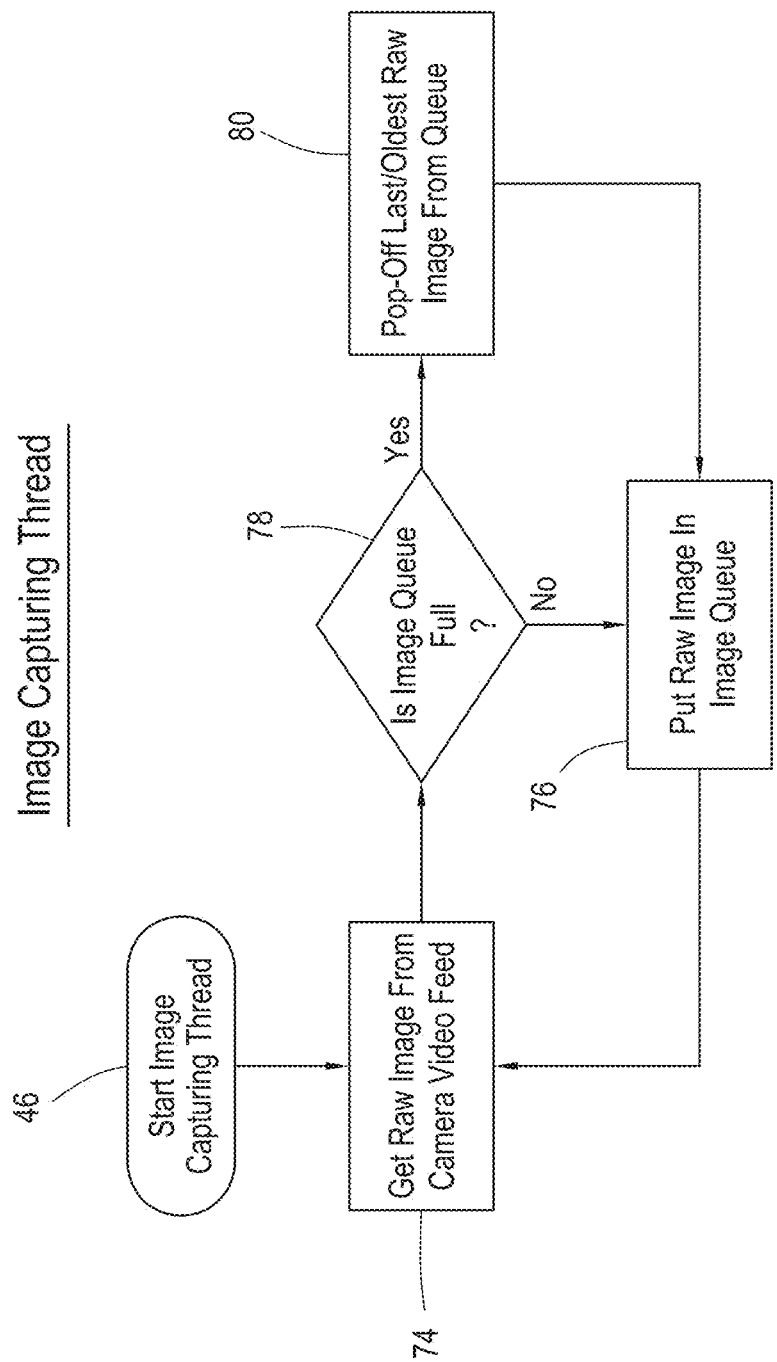
FIG. 12 is a flow chart showing details of the image capturing step/thread of FIG. 10.

Referring to FIG. 10, the overall concept of a preferred embodiment of a method of imaging an object to read information, specifically the machine readable zone (MRZ) of an object or document, will now be described. As shown, upon activation the controller in step 42 discovers hardware on the underlying device, for example, mobile phone, smart phone, tablet, etc., to identify the number of processors. The step 42 is followed by the controller initializing various threads, modules, and camera (step 44). Upon initialization of the threads, modules and camera, an image capturing thread is run in step 46, which obtains the raw images (FIG. 5) from the camera video feed and places them in an image queue (FIG. 12).

Figure 13:
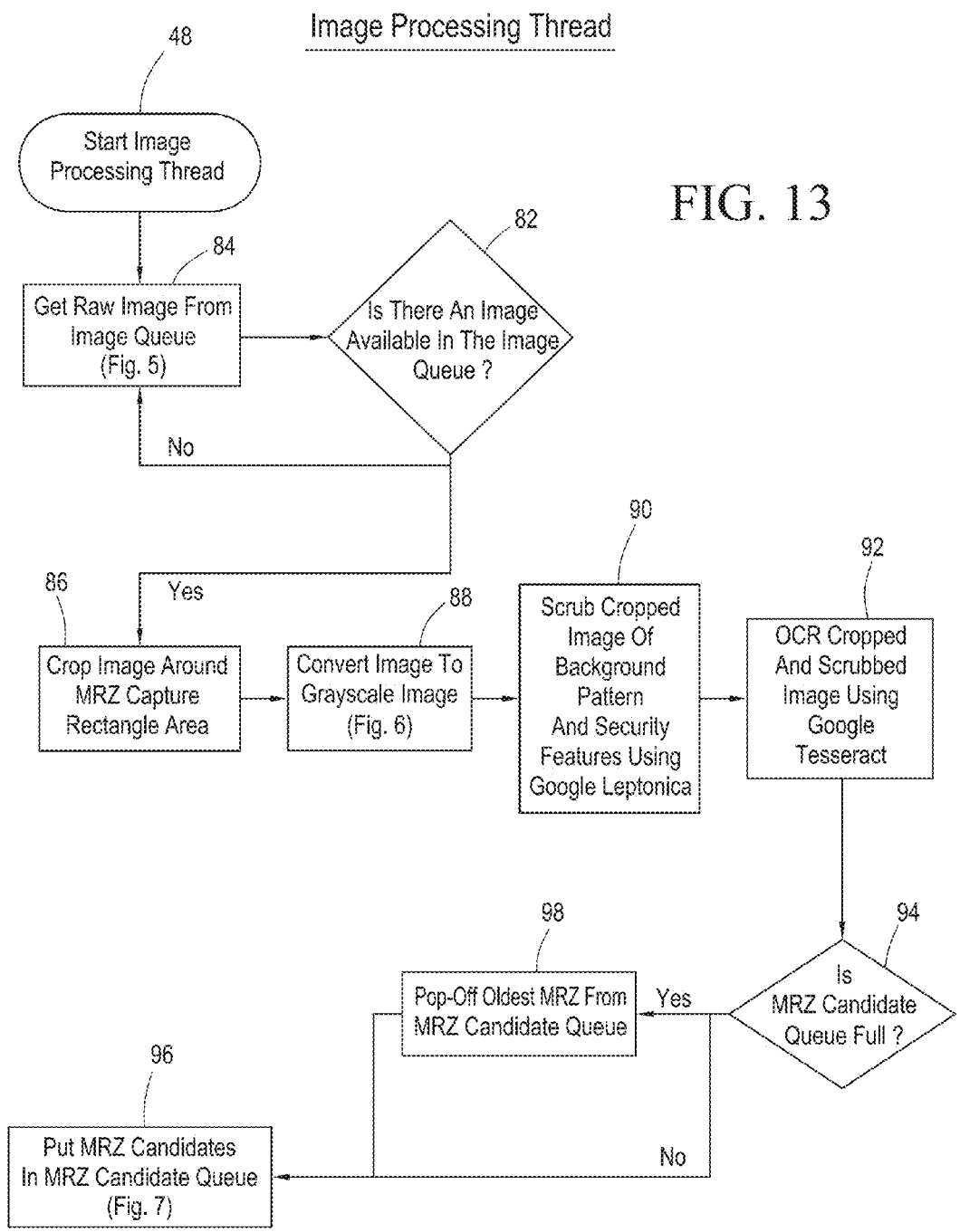
FIG. 13 is a flow chart showing details of the image processing step/thread of FIG. 10.

The raw images from the image queue are then processed by running preferably substantially simultaneously, multiple image processing threads in step 48 (FIG. 13). More specifically, two or more image processing threads, and preferably as many image processing threads as there are processors on the mobile device MD, are run. As described below in more detail, the image processing threads create or produce MRZ candidates (FIG. 7) that are placed in an MRZ queue. The MRZ candidates are further analyzed by running an image analysis thread in steps 50 and 52. In particular, in step 50, a preliminary analysis of the MRZ candidates yields MRZ rectangles/areas to identify or recognize blobs that in step 52 are further analyzed to create an MRZ and placed in an MRZ queue (FIGS. 8 and 14). In step 54, a composite MRZ is created upon a timer expiring a predetermined time period of preferably 3 to 8 seconds, or the MRZ queue reaching a predetermined threshold of at least 3 MRZs (FIGS. 8 and 16). In step 56, the final MRZ is created by further parsing and correcting the composite MRZ (FIGS. 9 and 20), by following parsing and correction methods illustrated in FIGS. 17 and 19, respectively. Steps 54 and/or 56 may optionally be part of the image analysis thread.

Figure 11:
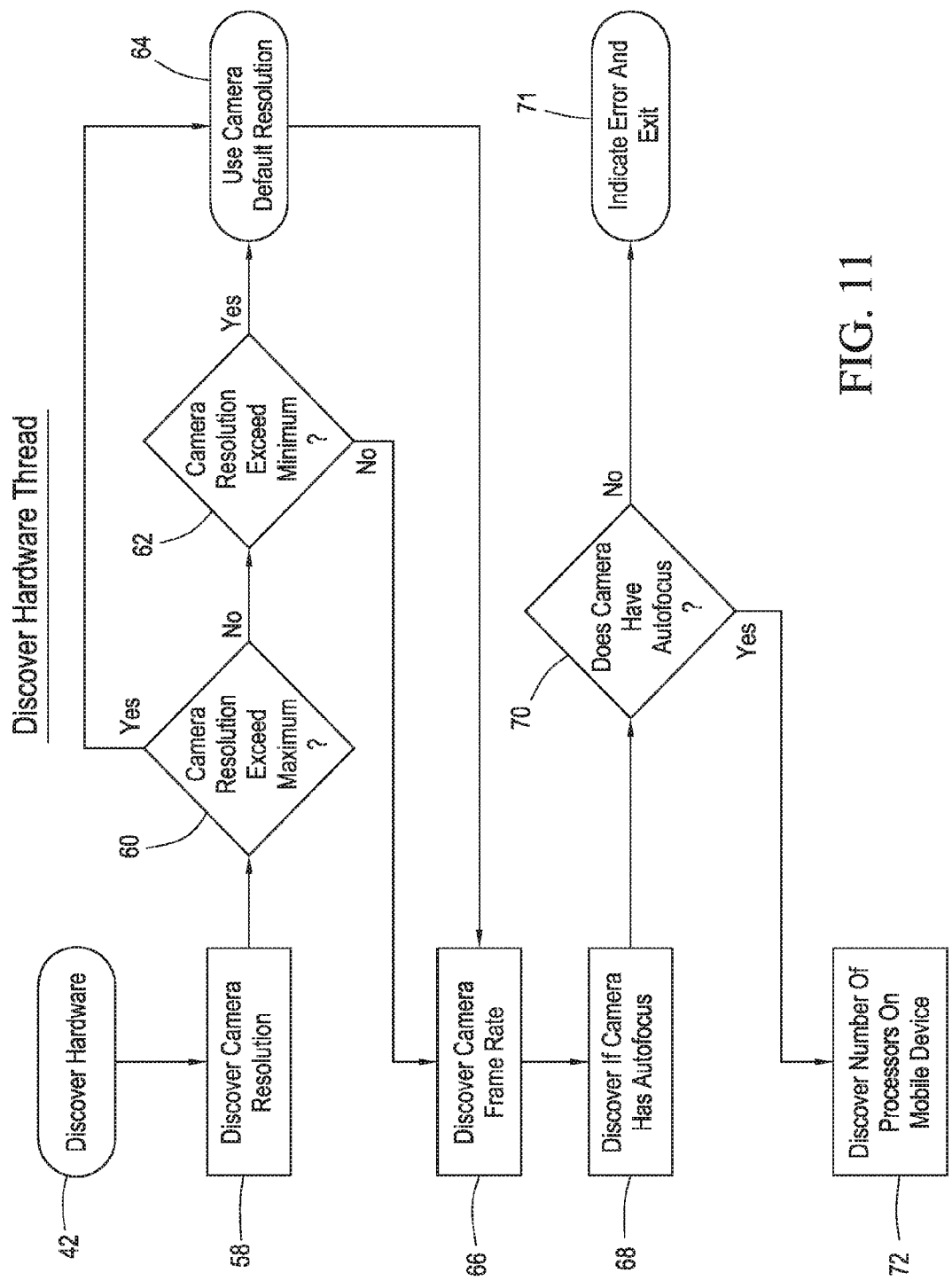
FIG. 11 is a flow chart showing details of the discovery and/or identification of the hardware step/thread of the method of FIG. 10.

Referring to FIG. 11, the hardware discovery/identification step 42 of FIG. 10 will now be described. As shown, in step 58, the camera resolution is determined to find an optimum preview size/value by obtaining camera-supported preview sizes and calculating a screen aspect ratio using the minimum (470×320) and maximum (800×600) resolutions. If the value exceeds the maximum (step 60) or the minimum resolution (step 62), the default camera resolution is used (step 64). Then, the camera frame rate is determined in step 66, followed by whether or not the camera has autofocus (step 68). (The frame rate is preferably set to the maximum camera frame rate.) If the camera does not have autofocus (step 70) an error is indicated and the step exits at 71. Otherwise, the discovery hardware step 42 proceeds to the next step of discovering or identifying the number of processors on the mobile device in step 72. As noted above, once the hardware has been discovered or identified and the number of processors determined, various threads, modules, and camera are initialized in step 44, followed by starting an image capturing thread in step 46. As illustrated in FIG. 12, raw images from the camera video feed are obtained in step 74 and placed in an image queue in step 76, if it is determined that the image queue is not full (step 78). If the image queue is full, the oldest or last-in-line raw image is popped-off from the queue (step 80) to make available the most recent raw images for an image processing thread (step 48 in FIG. 10).

Referring to FIG. 13, the details of an image processing thread of step 48 will now be described. As shown, if there is a raw image available in the image queue (step 82) it is obtained and cropped around a predetermined MRZ window or rectangle area (step 86, also described above). The cropped image is then converted to a gray scale image in step 88 (see FIG. 6). The gray scale image, obtained in step 88, is then scrubbed to remove, for example, background pattern, imagery, security features, etc., preferably by using widely available Google Leptonica software (step 90). The removal of the background imaging information is preferred as it can easily confuse the OCR (optical character recognition) processing. In particular, the text in the image would appear darker than the background imaging and the color is typically darker, as well as the text would have a higher saturation of pixels that are darker. The scrubbing in step 90 analyzes the gray scale image and removes the pixels that are less saturated and are of a lighter color. This step, therefore, filters out the background patterns to isolate the text for further processing. Next, in step 92, a low-level or fast OCR is performed to extract the characters/character strings from the scrubbed image obtained in step 90. The step 92 is performed preferably by using widely available Google Tesseract software, which converts images of typed, handwritten or printed text into machine-encoded text for further processing. The extracted characters/character strings obtained in step 92 are considered MRZ candidates (MC), an illustration of which is provided in FIG. 7. The MRZ candidates (MC) are then placed in an MRZ candidate queue (step 96) after determining whether the MRZ candidate queue is full or not (step 94). If the MRZ candidate queue is full, the oldest MRZ is popped-off the MRZ candidate queue in step 98, so that the most recent MRZs are available for the image analysis thread (steps 50 and 52 in FIG. 10).

Referring to FIG. 14, an image analysis thread (steps 50 and 52 in FIG. 10) will now be described. As shown, in step 100, the presence of an MRZ candidate is detected in the MRZ candidate queue. If an MRZ candidate is detected, it is determined whether the MRZ candidate is the first in the MRZ candidate queue (step 102). If the MRZ candidate detected is the first in the MRZ candidate queue, the auto capture timer thread (FIG. 15) is started (step 104). If the MRZ candidate detected in the MRZ candidate queue is not the first MRZ candidate, the presence of a predetermined size MRZ rectangle is detected, and further determined whether the rectangle is a 2×44 size rectangle (step 106), and if not, if it is a 3×30 rectangle in the MRZ (step 108). It is noted herewith that a 2×44 rectangle is detected where the units are in characters corresponding to one of the several two-line travel documents. Likewise, 3×30 rectangle is where the units are in characters corresponding to one of the several three-line travel documents. Upon detection of a two or three line rectangle (steps 106 and 108, respectively), the rectangle is recognized/interpreted as an MRZ blob, which is parsed (step 112), validated (step 114), context corrected (step 116), and placed in an MRZ queue in step 118. The parsing, validation, and correction steps 112, 114, and 116, are further illustrated in FIGS. 17-19, respectively. It is noted that if a blob is not detected or recognized in step 110, no further analysis occurs and another MRZ candidate is obtained from the MRZ candidate queue (step 100). If the MRZ queue has reached a predetermined capture threshold, e.g., at least three, in step 120, a composite MRZ is then created in step 122 (FIG. 16).

Figure 15:
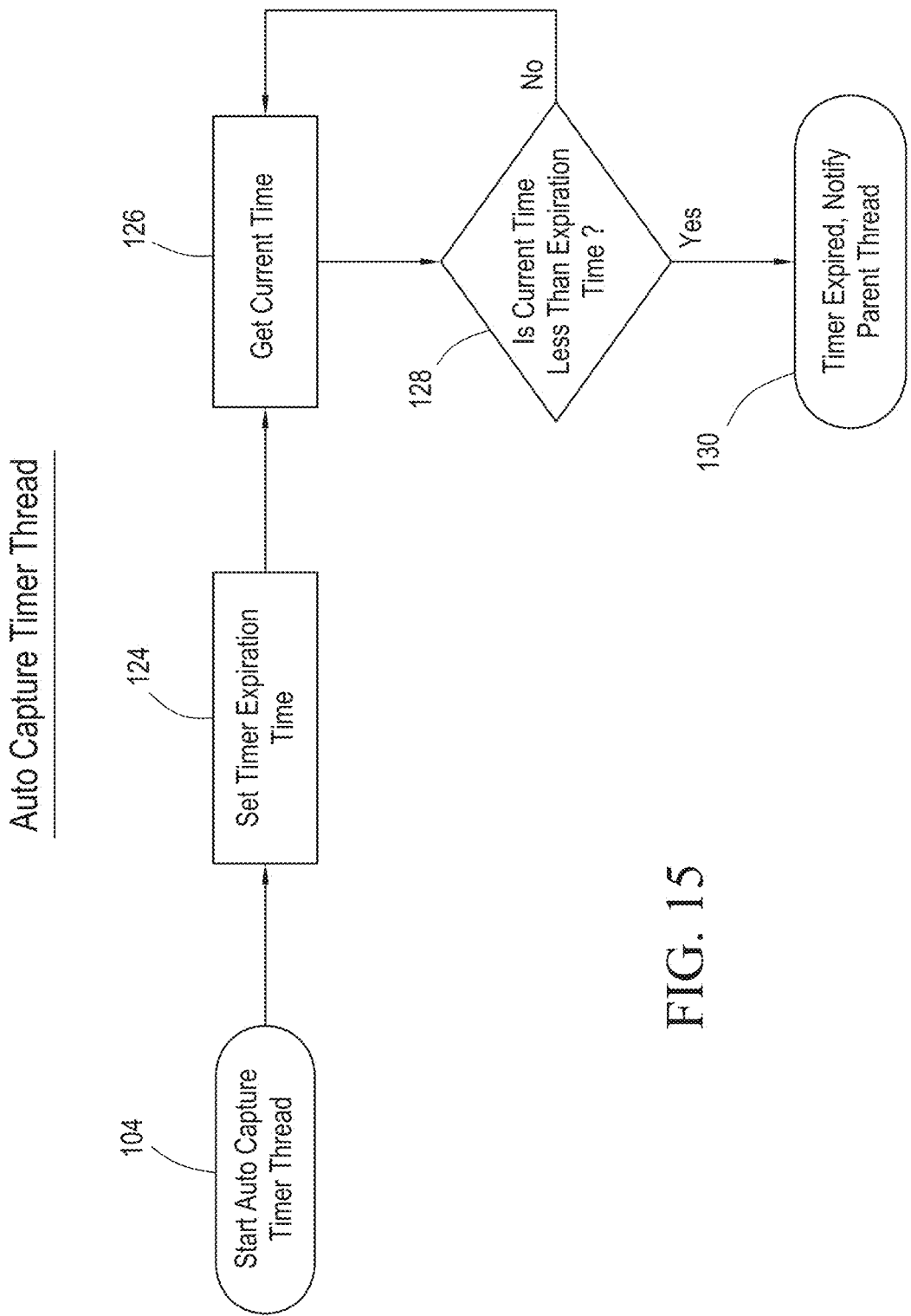
FIG. 15 is a flow chart showing details of the auto capture timer thread of FIG. 14.

As noted above, in step 104 of the image analysis thread (FIG. 14), an auto capture timer thread is started. As shown in FIG. 15, a timer expiration is set in step 124 based on a preselected time inputted by a user, or preset by some other means. As noted above, preferably the preselected time is selected from 3 to 8 seconds. In step 126, the current time is determined and compared with the expiration time (step 128). Upon expiration of the timer, the parent thread is notified in step 130.

FIG. 16 illustrates a flow chart of creating a composite MRZ. As shown, the composite factory is started in step 132 upon receiving a request (step 134) to create a composite MRZ from the MRZ list, as described above. A blank composite MRZ is initialized in step 136 and the MRZ index is set to 0 (zero) in step 138. The blank MRZ column index is initialized to 0 (zero) in step 140, followed by initializing character count list in 142. If it is determined that the maximum MRZ index is reached in step 144, the thread ends by returning a composite MRZ at 146 for creating a final MRZ (see FIG. 20). On the other hand, if the maximum MRZ index is not reached in step 144, a determination is made whether a maximum MRZ column position is reached in step 148. If yes, the MRZ index is advanced in step 150 to step 140. If, on the other hand, the maximum MRZ column position is not reached in step 148, a character is obtained in the MRZ index and a column index is created in step 152. A search for the character in the character count list is executed in step 154. If the character is found in the character count list in step 156, the character count is incremented for that character at the found position in the character count list in step 158. Otherwise, the character is added to the character count list with a value of 1 in step 160 and the thread returns back to step 158.

The parsing of an MRZ (blob) will now be described with reference to FIG. 17. As shown, if the MRZ (blob) is determined to be null or blank in step 162, the parsing step ends at 164. If not, the number of lines in the MRZ (blob) is counted in step 166, and if only one line is found in step 168, the parsing ends at 170. Otherwise, the type of the document is obtained from the MRZ (blob) in step 172, and if the document is unknown type (step 174), it is determined in step 176 whether the MRZ (blob) contains two lines in step 176, and if yes, the document type is determined to be a generic two line document, for example, a passport (step 178). However, if the MRZ (blob) is not a two line MRZ, the document type is determined to be a generic three line document, for example, EDL (Enhanced Driver's License) (step 180). Once a two line or three line generic document type is determined in either step 178 or 180 (or if the document type is not known in step 174), a pre-loaded template of various document types is retrieved in step 182, and the next field in the template is obtained (step 184). If no additional fields in the template are found in step 186, the list of the parsed fields is returned and parsing ends at 188. However, if in step 186, additional fields are identified, it is determined whether the field start is out of bounds (step 190), and if yes, the starting position is set to 0 (zero) (step 192). Otherwise, it is further determined whether the field end is out of bounds (step 194), and if not, the fixed field is parsed from the start to the end position in step 196. If, however, in step 194 it is determined that the field end is out of bounds, the end position is set to the end of line (step 198), followed by parsing in the fixed field from start to the end position.

Figure 18:
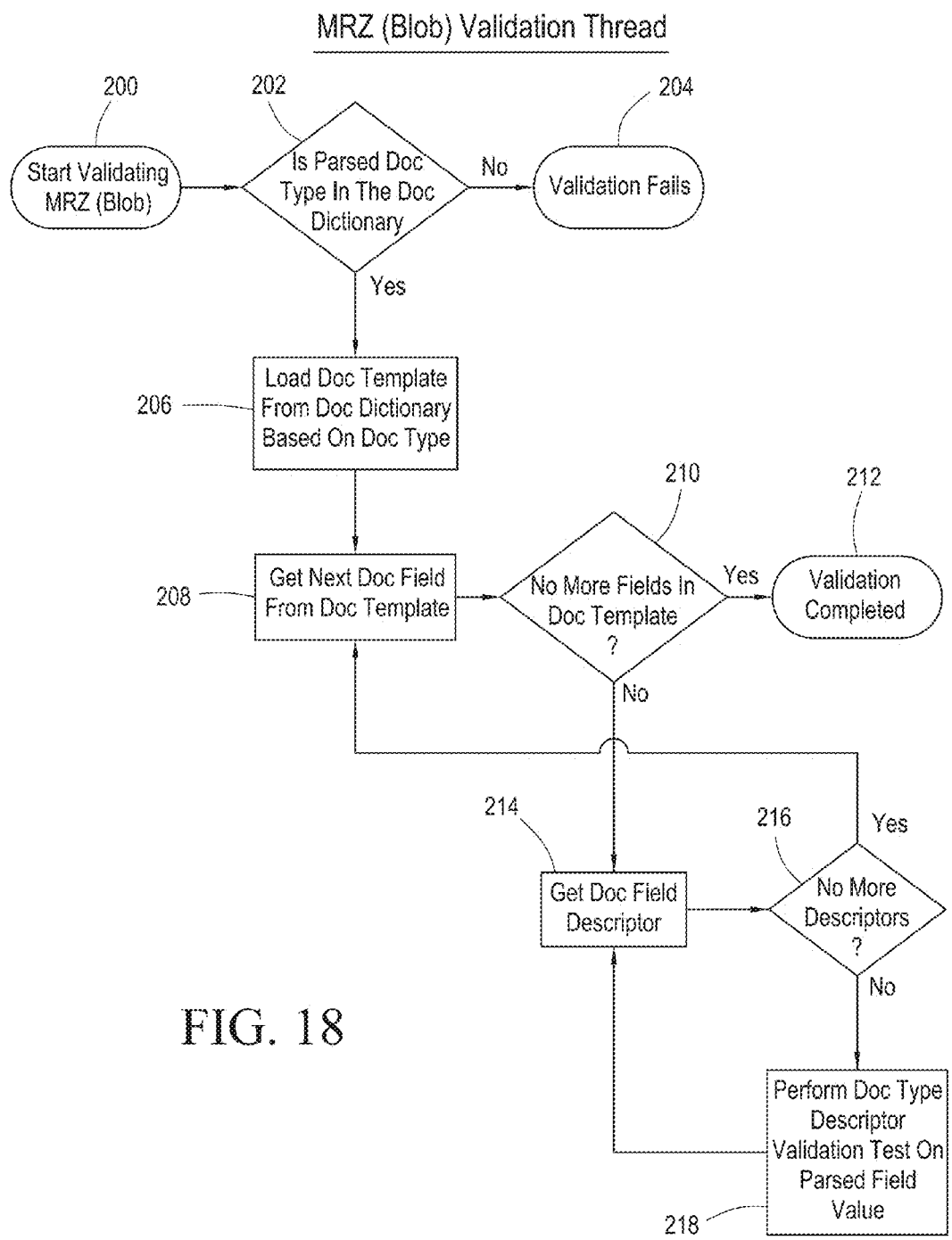
FIG. 18 is a flow chart showing details of the validation of MRZ (blob) step of FIG. 14.

FIG. 18 illustrates a flow chart of the validation step 114 of the image analysis thread illustrated in FIG. 14. Upon start at 200, it is determined whether the parsed document matches a type of the document in the pre-loaded dictionary (step 202), and if not, the validation fails (step 204). Otherwise, a document template corresponding to the type of the document determined in step 202, is retrieved from the pre-loaded document dictionary (step 206) and the next document field from the document template is obtained in step 208 for comparison. If no more fields in the template are located (step 210), the validation is completed at step 212. If, on the other hand, additional fields are detected in the document template, the document field descriptor is obtained (step 214). If no more descriptors are identified (step 216), the thread returns back to step 208. However, if the result in step 216 is negative, a document type descriptor validation test is executed on the parsed field value in step 218.

Figure 19:
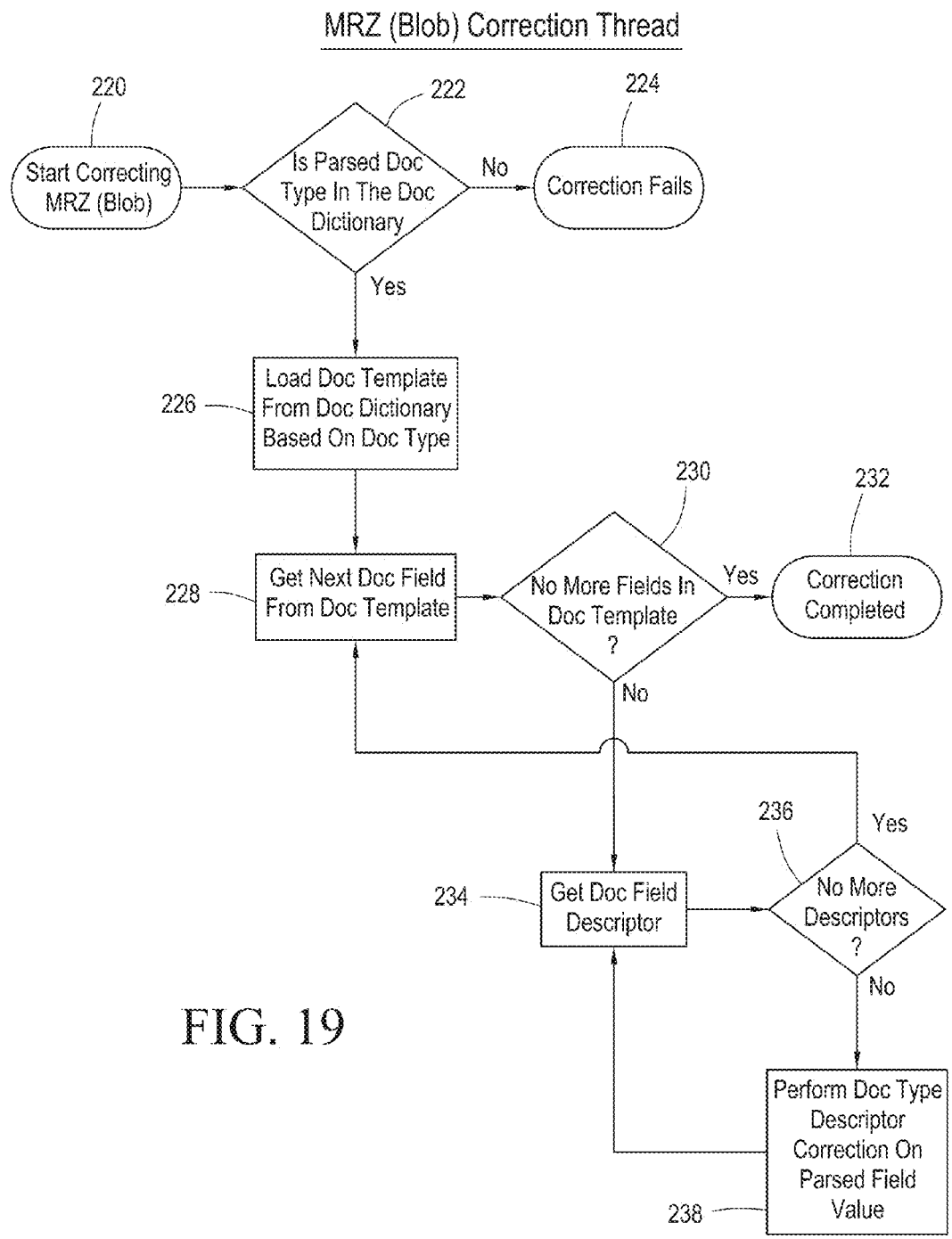
FIG. 19 is a flow chart showing details of the context correction of MRZ (blob) step of FIG. 14.
Figure 20:
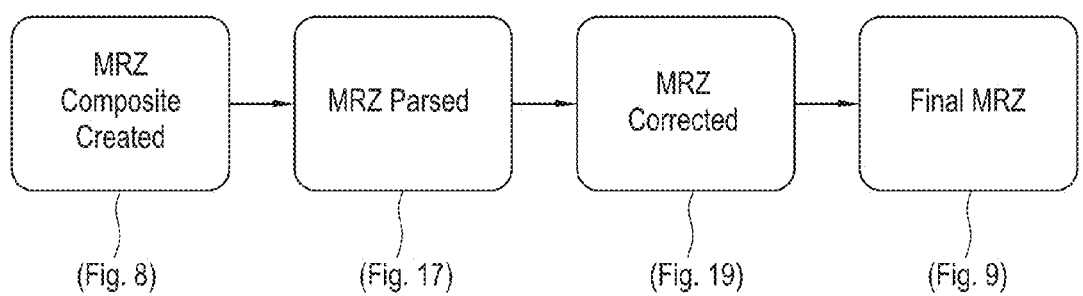
FIG. 20 is a block diagram showing preferred final steps in capturing an image in accordance with a preferred embodiment of the present invention.

FIG. 19 illustrates a flow chart of the context sensitive correction step 114 of the image analysis thread illustrated in FIG. 14. Upon start at 220, it is determined whether the parsed document matches a type of the document in the pre-loaded dictionary (step 222), and if not, the validation fails (step 224). Otherwise, a document template corresponding to the type of the document determined in step 222, is retrieved from the pre-loaded document dictionary (step 226) and the next document field from the document template is obtained in step 228 for comparison. If no more fields in the template are located (step 230), the validation is completed at step 232. If, on the other hand, additional fields are detected in the document template, the document field descriptor is obtained (step 234). If no more descriptors are identified (step 236), the thread returns back to step 228. However, if the result in step 236 is negative, a document type descriptor validation test is executed on the parsed field value in step 238.

As noted above, the present invention uses a template/directory/dictionary of various document types that is preferably pre-loaded, or can be retrieved from another source, as needed. As also noted above, an MRZ consists of a series of characters arranged in two or three lines/rows; and the data in the MRZ consists of two rows of 44 characters each, or three rows of 30 characters each. The only characters presently allowed are A-Z, 0-9 and the filler character<. The rows contain fields that are positioned in fixed location with a maximum width. The positions and names of these fields can change based on the type of travel document. The only field that has the same position in all of the current travel documents, is the travel document type, which is in the first two positions of the MRZ. It appears in the first row of a two or three line document. Based on the travel document type, the rest of the field positions can be determined and the value of the fields parsed. The International Civil Aviation Organization (ICAO) has published the 9303 specification document, which describes the structure and field descriptions for different travel documents. It is used as a blueprint for countries to construct travel documents. Preferably, the present invention uses a travel document dictionary implementing the data structures of the different travel documents as described in the ICAO 9303 document. (It is noted herewith that it is within the scope of the invention to use other types of dictionaries/directories, etc.) This document not only describes the character positions for each field in the MRZ zone of a travel document, but also data types and restrictions of each field. In addition, the 9303 document describes the system of check digit validation for the MRZ fields and zone. As described below, this dictionary can be modified by a user.

As illustrated above, an application of the present invention parses, validates, and corrects an MRZ in travel documents by determining the travel document type. Each travel document type may have differences in the number of fields, their positions and types. Each field will have descriptors that will define how the MRZ should be validated and corrected to the field.

The travel document dictionary includes a list of travel documents. Each travel document typically contains a number of attributes, including:
Descriptive name of the travel document.
2-letter code for the document type.
Number of expected lines in the travel document MRZ.
List of fields in the travel document.

The list of fields contains a collection of fields which make up the MRZ. Each field can have one or more of the following attributes:
Line number—the line number of the MRZ where the field appears.
Starting position—the starting position within the line. This offset begins with the value of 1, and not 0 (zero).
Length—maximum length of the field.
Descriptors—a bitwise integer value specifying the descriptors of the field. These values affect how the field will be validated and perhaps corrected.
   Mandatory—if this appears as a descriptor, the field must be non-blank.
   Alpha—if this appears as a descriptor, the field only supports alphabetic characters (no numbers).
   Numeric—if this appears as a descriptor, the field only supports numeric characters (no alphabetic).
   Set—if this appears as a descriptor, the field can only be one of the values specified in the "Set Values" attribute. For example "Gender" can be "M, F, X" as set values.
   Check Digit—if this appears as a descriptor, the field is a check digit value corresponding to the fields specified in "check digit of" attribute.
   Future Date—if this appears as a descriptor, the field is a 6 digit date filed having the following format (YYMMDD) where "YY" is a two digit year, "MM" is a two digit month, and "DD" is a two digit day. All numbers begin with 1, and not 0 (zero). This descriptor tests whether the date is in the future or not (i.e., expiration date).
   Past Date—has the same date format as "Future Date". If this appears as a descriptor, a test is performed to determine if the data is in the past (i.e., birth date).
   Check digit of—a comma (,) separated list of field names which refer to fields that a check digit calculation is made, if the field has a "check digit" descriptor.
   Set values—a comma (,) separated list of values making up a set.

Users, including application developers and others, may modify or add new entries into the document dictionary by calling the API (application programming interface) of the invention. The invention provides an ability to be customized by the user, developer, etc. New documents or the behavior of existing documents may be altered. The preferred manner of how the present invention handles travel documents is a data driven approach. In particular, the invention preferably defines the way a document is structured and should be validated or corrected by a set of values that may be modified.

It is noted herewith that although the present invention has been described/illustrated for reading and/or capturing images of various travel documents, it can be used/configured for reading and/or capturing images of other documents/materials/indicia, such as bar codes, license plates, labels (such as cargo container labels), etc.

It is further noted herewith that reference(s) made herein to iPhone®, IOS® platforms, etc., are merely for the purpose of illustration, and the invention is not limited thereto in any manner whatsoever. In this regard, the invention can be applied to other mobile devices, platforms, systems, etc., presently known or available, or in future.

It is also noted herewith that while the preferred embodiment(s) of the invention has been illustrated herein by referring to a mobile device, the scope of the invention includes, but not limited to, non-mobile and/or other devices, platforms, systems, processors, computing devices, computers, computer networks, etc.

It is also noted herewith that the method(s) of the invention need not be performed in the order written or as recited in claims. They can be performed in a different order.

While this invention has been described as having preferred sequences, ranges, ratios, steps, order of steps, materials, structures, symbols, indicia, graphics, color scheme(s), shapes, configurations, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the claims appended hereto or presented later. The invention, therefore, is not limited to the preferred embodiment(s) shown/described herein.

What is claimed is:

1. A mobile computing device-implemented method of imaging an object to read information, comprising the steps of:
   a) capturing a plurality of raw images of the object by an image capturing component of the mobile computing device and placing in a first queue in a first memory location;
   b) processing, in one or more processors of the mobile device, a plurality of raw images substantially simultaneously to extract potential machine readable zone (MRZ) candidates and placing in a second queue in a second memory location;
   c) analyzing one of the MRZ candidates from the second queue to detect the presence of a predetermined size MRZ rectangle;
   d) creating an MRZ blob if an MRZ rectangle is detected in step c);
   e) processing the MRZ blob to form an MRZ;
   f) placing the MRZ of step e) in a third queue in a third memory location; and
   g) creating a composite MRZ if a timer has expired, or the third queue has reached a predetermined threshold.

2. The method of claim 1, wherein:
   the step b) comprises processing a plurality of raw images separately by individual processors of the mobile device.

3. The method of claim 2, wherein:
   the processing step b) is carried out by two to six processors of the mobile computing device.

4. The method of claim 2, wherein the processing step b) comprises:
   i) cropping a raw image around a predetermined MRZ window area;
   ii) converting the cropped image to a gray scale image;
   iii) scrubbing the gray scale image; and
   iv) extracting text characters from the scrubbed gray scale image.

5. The method of claim 4, wherein:
   the extracted text characters comprise one or more character strings.

6. The method of claim 5, wherein:
the step c) comprises finding in the character strings two or three lines of characters of a predetermined length to detect an MRZ rectangle.

7. The method of claim 6, wherein:
a two-line MRZ rectangle comprises 44 characters in each line.

8. The method of claim 6, wherein:
a three-line MRZ rectangle comprises 30 characters in each line.

9. The method of claim 6, wherein:
the timer in step g) is set from 3 to 8 seconds.

10. The method of claim 6, wherein:
the predetermined threshold for creating a composite MRZ in step g) is three MRZs.

11. The method of claim 1, wherein:
the step g) comprises creating a composite MRZ from a plurality of MRZs by selecting each character appearing at a highest frequency among all of the MRZs in the third queue.

12. The method of claim 1, further comprising:
discarding, in step a), the oldest raw image if the first queue is full.

13. The method of claim 1, further comprising:
discarding, in step b), the oldest MRZ candidate if the second queue is full.

14. The method of claim 1, wherein:
the processing in step b) is carried out at a faster speed than the steps c), d), and e).

15. The method of claim 1, wherein:
the processing in step b) is carried out 20-30 times faster than the steps c), d), and e).

16. The method of claim 1, further comprising:
h) creating a final MRZ by parsing and correcting the composite MRZ.

17. The method of claim 6, wherein the MRZ blob processing step e) comprises:
i) parsing the characters in the MRZ blob to determine object type; and
ii) validating object type by comparing with a predetermined object template.

18. A mobile computing device-implemented method of imaging an object to read information, comprising the steps of:
a) initializing a plurality of image processing threads;
b) initializing one or more of image capturing and image analysis threads;
c) capturing, by running the image capturing thread, a plurality of raw images of the object by an image capturing component of the mobile computing device and placing in an image queue in a first memory location;
d) processing, by running the image processing threads, a plurality of raw images to extract potential machine readable zone (MRZ) candidates and placing in a MRZ candidate queue in a second memory location;
e) analyzing, by running the image analysis thread, an MRZ candidate to detect an MRZ and placing in an MRZ queue in a third memory location; and
f) creating a composite MRZ if a timer has expired, or the MRZ queue has reached a predetermined threshold.

19. The method of claim 18, further comprising:
starting the timer in step e) if the MRZ is first in the MRZ queue.

20. The method of claim 19, comprising:
creating the composite MRZ in step f) when three MRZs are placed in the MRZ queue.

21. The method of claim 19, comprising:
creating the composite MRZ in step f) when the timer has run a preselected time period from 3 to 8 seconds.

22. The method of claim 18, wherein:
the step a) comprises initializing two to six image processing threads.

23. The method of claim 18, wherein:
the number of image processing threads initialized in step a) corresponds to the number of slots in the image queue.

24. The method of claim 23, comprising:
the oldest raw image is discarded in step c) if the image queue is full.

25. The method of claim 18, comprising:
the oldest MRZ candidate is discarded in step d) if the MRZ candidate queue is full.

26. The method of claim 18, wherein each image processing thread in step d) comprises:
i) cropping a raw image around a predetermined MRZ window area;
ii) converting the cropped image to a gray scale image;
iii) scrubbing the gray scale image; and
iii) extracting text characters from the scrubbed gray scale image.

27. The method of claim 26, wherein:
the extracted text characters comprise one or more character strings.

28. The method of claim 27, wherein:
the step e) comprises finding in the character strings two or three lines of characters of a predetermined length to detect an MRZ.

29. The method of claim 28, wherein:
a two-line MRZ comprises 44 characters in each line.

30. The method of claim 28, wherein:
a three-line MRZ comprises 30 characters in each line.

31. The method of claim 18, wherein:
at least one of the image processing threads in step e) runs faster than the image analysis thread in step e).

32. The method of claim 31, wherein:
the at least one image processing thread runs 20-30 times faster than the image analysis thread.

33. The method of claim 18, further comprising:
detecting number of processors on the mobile device prior to step a).

34. The method of claim 33, wherein:
the step a) comprises initializing a plurality of image processing threads corresponding in number to the number of processors detected on the mobile device.

35. A non-transitory computer-readable medium with instructions stored thereon, that when executed by a processing device, perform the steps comprising:
a) initializing a plurality of image processing threads;
b) initializing one or more of image capturing and image analysis threads;
c) capturing, by running the image capturing thread, a plurality of raw images of an object by an image capturing component of the processing device and placing in an image queue in a first memory location;
d) processing, by running the image processing threads, a plurality of raw images to extract potential machine readable zone (MRZ) candidates and placing in an MRZ candidate queue in a second memory location;
e) analyzing, by running the image analysis thread, an MRZ candidate to detect an MRZ and placing in an MRZ queue in a third memory location; and
f) creating a composite MRZ if a timer has expired, or the MRZ queue has reached a predetermined threshold.

36. The non-transitory computer-readable medium of claim 35, comprising instructions for causing the processing device to:
   start the timer in step e) if the MRZ is first in the MRZ queue.

37. The non-transitory computer-readable medium of claim 36, comprising instructions for causing the processing device to:
   create the composite MRZ in step f) when three MRZs are placed in the MRZ queue.

38. The non-transitory computer-readable medium of claim 36, comprising instructions for causing the processing device to:
   create the composite MRZ in step f) when the timer has run a preselected time period from 3 to 8 seconds.

39. The non-transitory computer-readable medium of claim 35, comprising instructions for causing the processing device to:
   initialize two to six image processing threads in step a).

40. The non-transitory computer-readable medium of claim 35, comprising instructions for causing the processing device to:
   initialize in step a) the number of image processing threads corresponding to the number of slots in the image queue.

41. The non-transitory computer-readable medium of claim 40, comprising instructions for causing the processing device to:
   discard in step c) the oldest raw image if the image queue is full.

42. The non-transitory computer-readable medium of claim 35, comprising instructions for causing the processing device to:
   discard in step d) the oldest MRZ candidate if the MRZ candidate queue is full.

43. The non-transitory computer-readable medium of claim 35, comprising instructions for causing the processing device to perform, in each image processing thread in step d), the steps comprising:
   i) cropping a raw image around a predetermined MRZ window area;
   ii) converting the cropped image to a gray scale image;
   iii) scrubbing the gray scale image; and
   iv) extracting characters from the scrubbed gray scale image.

44. The non-transitory computer-readable medium of claim 43, wherein:
   the extracted text characters comprise one or more character strings.

45. The non-transitory computer-readable medium of claim 44, comprising instructions for causing the processing device in step e) to:
   find in the character strings two or three lines of characters of a predetermined length to detect an MRZ.

46. The non-transitory computer-readable medium of claim 45, wherein:
   a two-line MRZ comprises 44 characters in each line.

47. The non-transitory computer-readable medium of claim 45, wherein:
   a three-line MRZ comprises 30 characters in each line.

48. The non-transitory computer-readable medium of claim 35, comprising instructions for causing the processing device to:
   run at least one of the image processing threads in step d) faster than the image analysis thread in step e).

49. The non-transitory computer-readable medium of claim 48, comprising instructions for causing the processing device to:
   run the at least one image processing thread 20-30 times faster than the image analysis thread.

50. The non-transitory computer-readable medium of claim 35, comprising instructions for causing the processing device to:
   detect number of processors on the mobile device prior to step a).

51. The non-transitory computer-readable medium of claim 50, comprising instructions for causing the processing device to:
   initialize, in step a), a plurality of image processing threads corresponding in number to the number of processors detected on the mobile device.

52. The non-transitory computer-readable medium of claim 35, wherein:
   the processing device comprises a mobile device.

53. A system for imaging an object to read information, comprising:
   a) an image capturing component;
   b) a control module that runs:
      i) an image capturing thread to capture a plurality of raw images of the object by the image capturing component and place in an image queue;
      ii) a plurality of image processing threads, each of which processes a raw image to extract a potential machine readable zone (MRZ) candidate and places in an MRZ candidate queue;
      iii) an image analysis thread that analyzes an MRZ candidate to detect an MRZ and places in an MRZ queue;
   c) a first memory location for the image queue;
   d) a second memory location for the MRZ candidate queue;
   e) a third memory location for the MRZ queue; and
   f) wherein the control module creates a composite MRZ if a timer expires, or the MRZ queue has reached a predetermined threshold.

54. The system of claim 53, wherein:
   the control module runs image processing threads corresponding in number to the number of slots in the image queue.

55. The system of claim 53, wherein:
   the control module runs image processing threads corresponding in number to the number of processors in the system.

56. The system of claim 53, wherein:
   the control module runs two to six image processing threads substantially simultaneously.

57. The system of claim 53, wherein:
   the control module creates a composite MRZ when three MRZs are placed in the MRZ queue.

58. The system of claim 53, wherein:
   the control module creates a composite MRZ when the timer has run a preselected time period from 3 to 8 seconds.

59. The system of claim 53, wherein:
   the control module, when running an image processing thread, crops a raw image around a predetermined MRZ window area, gray scales the cropped image, and scrubs the gray scale image to extract an MRZ candidate.

60. The system of claim 53, wherein:
   the control module runs at least one of the image processing threads faster than the image analysis thread.

61. The system of claim 53, wherein:
the control module runs at least one of the image processing threads 20-30 times faster than the image analysis thread.

62. The system of claim 53, wherein the system comprises a mobile device.

63. A mobile computing device-implemented method of imaging an object to read information, comprising the steps of:
a) capturing a plurality of raw images of the object by an image capturing component of the mobile computing device and placing in a first queue in a first memory location;
b) processing, in one or more processors of the mobile device, a plurality of raw images substantially simultaneously to extract potential machine readable zone (MRZ) candidates and placing in a second queue in a second memory location;
c) analyzing one of the MRZ candidates from the second queue to detect the presence of an MRZ;
d) placing the MRZ of step c) in a third queue in a third memory location; and
e) creating a composite MRZ if a timer has expired, or the third queue has reached a predetermined threshold.

64. A mobile computing device-implemented method of imaging an object to read information, comprising the steps of:
a) capturing, by running an image capturing thread, a plurality of raw images of the object by an image capturing component of the mobile computing device and placing in an image queue in a first memory location;
b) processing, by running an image processing thread, one or more raw images to extract one or more potential machine readable zone (MRZ) candidates and placing in a MRZ candidate queue in a second memory location;
c) analyzing, by running an image analysis thread, an MRZ candidate to detect an MRZ and placing in an MRZ queue in a third memory location; and
d) creating a composite MRZ if a timer has expired, or the MRZ queue has reached a predetermined threshold.

65. A mobile computing device-implemented method of imaging an object to read information, comprising the steps of:
a) capturing a plurality of raw images of the object by an image capturing component of the mobile computing device and placing in a first queue in a first memory location;
b) processing, in one or more processors of the mobile device, a plurality of raw images substantially simultaneously to extract potential machine readable zone (MRZ) candidates and placing in a second queue in a second memory location;
c) analyzing one of the MRZ candidates from the second queue to detect the presence of a predetermined size MRZ rectangle;
d) creating an MRZ blob if an MRZ rectangle is detected in step c);
e) processing the MRZ blob to form an MRZ;
f) placing the MRZ of step e) in a third queue in a third memory location;
g) creating a composite MRZ if a timer has expired, or the third queue has reached a predetermined threshold; and
h) the step g) comprising creating a composite MRZ from a plurality of MRZs by selecting each non-handwritten character appearing at a highest frequency among all of the MRZs in the third queue.

66. A mobile computing device-implemented method of imaging an object to read information, comprising the steps of:
a) capturing a plurality of raw images of the object by an image capturing component of the mobile computing device and placing in a first queue in a first memory location;
b) processing, in one or more processors of the mobile device, a plurality of raw images substantially simultaneously to extract potential machine readable zone (MRZ) candidates and placing in a second queue in a second memory location;
c) analyzing one of the MRZ candidates from the second queue to detect the presence of a predetermined size MRZ rectangle;
d) creating an MRZ blob if an MRZ rectangle is detected in step c);
e) processing the MRZ blob to form an MRZ;
f) placing the MRZ of step e) in a third queue in a third memory location;
g) creating a composite MRZ if a timer has expired, or the third queue has reached a predetermined threshold; and
h) the processing step b) comprising:
i) cropping a raw image around a predetermined MRZ window area forming a rectangle of pixels;
ii) converting the cropped image to a gray scale image;
iii) scrubbing the gray scale image to remove background image information; and
iv) extracting text characters from the scrubbed gray scale image.

* * * * *